(12) United States Patent
Liang

(10) Patent No.: US 10,117,479 B2
(45) Date of Patent: Nov. 6, 2018

(54) SHOE AND METHOD FOR MAKING A SHOE

(71) Applicant: Regina Miracle International (Group) Limited, Kwai Chung (HK)

(72) Inventor: Changming Liang, Kwai Chung (HK)

(73) Assignee: REGINA MIRACLE INTERNATIONAL (GROUP) LIMITED, Hong Kong (HK)

( * ) Notice: Subject to any disclaimer, the term of this patent is extended or adjusted under 35 U.S.C. 154(b) by 0 days.

(21) Appl. No.: 15/223,501

(22) Filed: Jul. 29, 2016

(65) Prior Publication Data

US 2017/0027281 A1    Feb. 2, 2017

(30) Foreign Application Priority Data

Jul. 29, 2015  (CN) ........................ 2015 1 0455429
Jun. 8, 2016   (CN) ........................ 2016 1 0402840

(51) Int. Cl.
| | |
|---|---|
| *A43B 13/18* | (2006.01) |
| *A43B 13/04* | (2006.01) |
| *A43B 13/12* | (2006.01) |
| *A43B 13/32* | (2006.01) |
| *A43B 23/02* | (2006.01) |
| *B29D 35/00* | (2010.01) |
| *B29D 35/06* | (2010.01) |
| *B29D 35/12* | (2010.01) |

(Continued)

(52) U.S. Cl.
CPC ............ *A43B 13/187* (2013.01); *A43B 13/04* (2013.01); *A43B 13/125* (2013.01); *A43B 13/181* (2013.01); *A43B 13/32* (2013.01); *A43B 13/42* (2013.01); *A43B 23/026* (2013.01); *A43B 23/0245* (2013.01); *B29D 35/0009* (2013.01); *B29D 35/061* (2013.01); *B29D 35/122* (2013.01); *B29D 35/142* (2013.01); *B29K 2075/00* (2013.01); *B29K 2105/04* (2013.01)

(58) Field of Classification Search
CPC ....... A43B 13/04; A43B 13/125; A43B 13/42; A43B 23/026; A43B 23/0245; B29D 35/0009; B29D 35/061; B29D 35/062; B29D 35/122; B29D 35/142
USPC .......................... 36/17 R, 19, 14, 68, 69, 45
See application file for complete search history.

(56) References Cited

U.S. PATENT DOCUMENTS

| | | | | |
|---|---|---|---|---|
| 4,255,877 A | * | 3/1981 | Bowerman ............ | A43B 23/17 36/128 |
| 5,396,675 A | * | 3/1995 | Vincent ................. | A43B 13/12 12/142 P |

(Continued)

FOREIGN PATENT DOCUMENTS

CN         103976505 A      8/2014

OTHER PUBLICATIONS

Chinese Office Action, dated Jul. 3, 2018, issued in corresponding Chinese Patent Application No. 201510455429.4. Includes English translation. Total 13 pages.

*Primary Examiner* — Ted Kavanaugh
(74) *Attorney, Agent, or Firm* — Ostrolenk Faber LLP

(57) ABSTRACT

A shoe and a corresponding method for making a shoe are disclosed. A shoe according to an embodiment includes: an upper including a main body; a midsole, an outside edge of the midsole being attached to a lower edge of the main body, the midsole being formed to define a first accommodation space; and a first fill injected in the first accommodation space.

8 Claims, 47 Drawing Sheets

(51) Int. Cl.
*B29D 35/14* (2010.01)
*A43B 13/42* (2006.01)
*B29K 75/00* (2006.01)
*B29K 105/04* (2006.01)

(56) References Cited

U.S. PATENT DOCUMENTS

| | | |
|---|---|---|
| 9,968,157 B2 | 5/2018 | Wardlaw |
| 2002/0020080 A1* | 2/2002 | Duclos ............... A43B 9/04 36/78 |
| 2004/0123492 A1* | 7/2004 | Duclos ............... A43B 9/04 36/25 R |
| 2011/0197470 A1* | 8/2011 | Caron ............... A43B 1/0072 36/29 |
| 2016/0136910 A1* | 5/2016 | Krajcir ............... B29D 35/10 12/146 B |

\* cited by examiner

SHOE AND METHOD FOR MAKING A SHOE

CROSS-REFERENCE TO RELATED APPLICATIONS

The present application claims benefit of Chinese patent application no. 201510455429.4, filed Jul. 29, 2015 and Chinese patent application no. 201610402840.X, filed Jun. 8, 2016, the contents of each are incorporated herein by reference in their entirety.

TECHNICAL FIELD

The present invention relates to footwear and footwear manufacturing. Specifically, it relates to a shoe and a corresponding method for making the shoe.

BACKGROUND

Currently, a shoe usually involves compromising between compressive deformation and the shoe's weight in the choice of material. For example, with respect to a shoe's sole, a sole with excellent compressive deformation (such as EVA midsoles) is usually of poor durability, while a sole with good durability (such as PU midsoles) often has a relatively heavy weight.

SUMMARY OF THE INVENTION

The present invention is intended to provide a shoe which has a relatively light weight and excellent durability.

The present invention also provides a corresponding method for making the shoe.

According to an aspect of the present invention, a shoe is provided, which includes an upper including a main body; a midsole, an outside edge of the midsole being attached to a lower edge of the main body of the upper, the midsole being formed to define or include a first accommodation space; and a first fill injected in the first accommodation space.

Preferably, the midsole may be of a three-dimensional shape so as to form the first accommodation space.

Preferably, the upper may further comprise: a lower portion or extension, an upper rim of which is attached to the main body, the lower portion or extension of the upper covering a lower part of the main body of the upper so that a second accommodation space is formed between the lower portion or extension of the upper and the main body of the upper; and a second fill injected in the second accommodation space.

Preferably, at least a portion of the midsole may be wrapped around by the lower portion of the upper, and the first accommodation space is formed between the lower portion of the upper and a bottom surface of the midsole.

Preferably, the shoe may further comprise: an outsole covering the bottom surface of the midsole injected with the first fill.

Preferably, the midsole may comprise a first fabric layer and a first leakage preventing film adhered to the first fabric layer to prevent the first fill from leakage.

Preferably, the main body may comprise a second fabric layer and a second leakage preventing film adhered to the second fabric layer to prevent the second fill from leakage.

Preferably, the main body may also comprise a front portion and a back portion attached to each other, and the back portion is formed by molding.

Preferably, the lower portion of the upper may include a leakage preventing material.

Preferably, at least one of the first fill and the second fill may be a thermoset material, for example polyurethane or polyurethane foam.

Preferably, at least one of the first accommodation space and the second accommodation space may be shaped by molding.

According to another aspect of the present invention, a method for making a shoe is provided, which includes: forming a midsole having a first accommodation space; injecting a first fill into the first accommodation space; shaping the injected first accommodation space by molding; and affixing an upper and an outsole with the midsole.

Preferably, the upper may comprise a main body and a lower portion, and the method for making the shoe may further comprise: attaching an upper rim of the lower portion of the upper to the main body such that the lower portion of the upper covers a lower part of the main body so that a second accommodation space is formed between the lower portion of the upper and the main body of the upper; injecting a second fill into the second accommodation space; and shaping the injected second accommodation space by molding.

Preferably, attaching the upper rim of the lower portion of the upper to the main body may comprise: forming the lower portion of the upper to cover the lower part of the main body and wrap around at least a portion of the midsole such that the first accommodation space is formed between the lower portion of the upper and a bottom surface of the midsole.

Preferably, the method for making a shoe may further comprise: adhering a first leakage preventing film to the midsole to prevent the first fill from leakage.

Preferably, the method for making a shoe may further comprise: adhering a second leakage preventing film to the main body to prevent the second fill from leakage.

Preferably, the first fill and the second fill may be thermoset materials, for example polyurethane or polyurethane foam.

BRIEF DESCRIPTION OF THE DRAWINGS

FIG. 34B shows a semi-finished shoe shown in FIG. 34A and a midsole affixed with that;

FIG. 35A shows a shoe shown in FIG. 34B and a lower portion of the upper affixed with that;

DETAILED DESCRIPTION OF EMBODIMENTS

Figure 1:
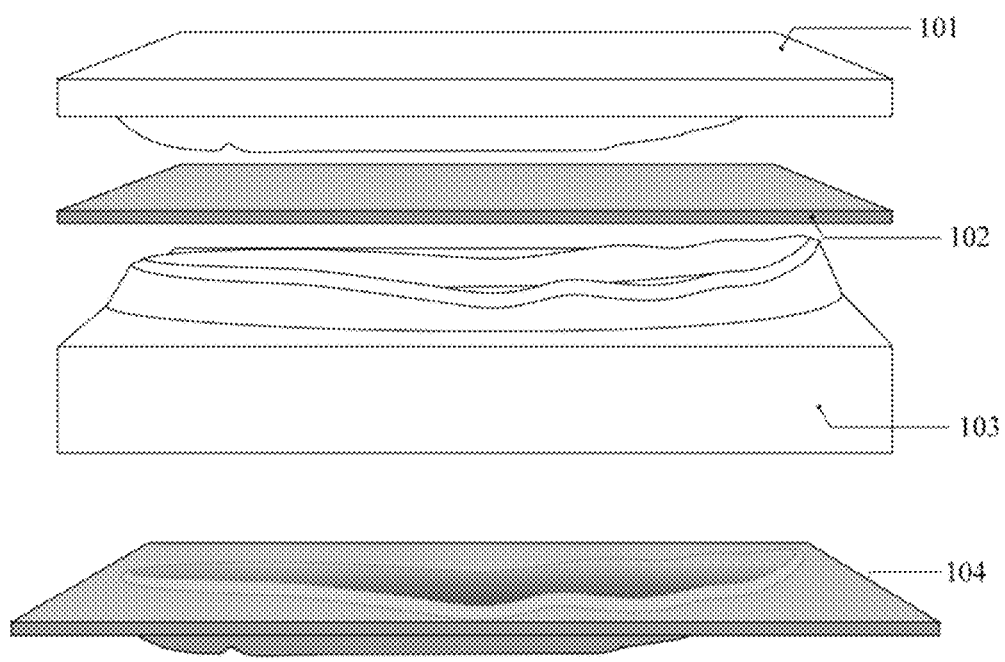
FIG. 1 shows a molded lower part of a sole according to a first example of a first embodiment.

According to one aspect of the present invention, a shoe is provided including an upper and a midsole, wherein the upper includes a main body, an outside edge of the midsole is attached to a lower edge of the main body, and the midsole has a first accommodation space with a first fill injected into the first accommodation space.

According to one embodiment, the midsole is of a three-dimensional shape so as to form the first accommodation space for the first fill. Various exemplary embodiments of the embodiment will be described in detail below.

According to another aspect of the present invention, a sole (or midsole) is provided which is made of two types of material. Specifically, a lower part of the sole comprises a first material which has a three-dimensional shape, and a fill comprising a second material is injection molded (or pouring-molded) at the lower part of the sole.

In an embodiment, the lower part of the sole comprises a flexible material such as fabric, and the fill is of a thermoset material such as polyurethane (PU) or polyurethane foam (PU foam). In other embodiments, the lower part of the sole may comprise any suitable flexible material, and the fill may be of other thermoset materials such as polyether polyols (for example, TMD-5000, Third Petrochemical Industry of Tianjin) and polyisocyanates (MDI, for example, PAPI-27, Dow Chemical Co.).

The sole described above and in this description may actually be a midsole, in which case an outsole may be affixed to and under the lower part of the sole described above.

A leakage preventing film may be adhered to an upper side of the lower part of the midsole described above to prevent the fill from leakage during manufacture. The leakage preventing film, for example, may be a TPU (Thermoplastic Polyurethane) film, or may be other plastic film or film formed of spray adhesives. The leakage preventing film may be adhered by adhesive or by vacuum forming. The leakage preventing film may be adhered to the upper side of the lower part of the sole by other suitable means.

Alternatively, the lower part of the sole may be formed directly of a flexible leakage preventing material.

An upper part of the sole may be provided to cover the three-dimensional shaped lower part of the sole so as to form a cavity in between the upper and the lower part of the sole, and thereby the fill can be injected or poured into the cavity. In this case, a leakage preventing film can be adhered to the lower side of the upper part of the sole to prevent the fill from leakage. The leakage preventing film may be adhered to both of the upper side of the lower part of the sole and the lower side of the upper part of the sole or to only one of them. The leakage preventing films adhered to the upper side of the lower part of the sole and to the lower side of the upper part of the sole may be of the same material or of different materials. As used in this description, the terms "injection molding", "injecting", or "injected" refer to injecting or pouring a filling material into a cavity, instead of injection molding in a strict sense.

When both an upper part and a lower part of a sole or midsole are provided, an opening may be provided in either the upper part or the lower part, so that a fill can be injected in between the upper part and the lower part through the opening in the upper part or, as the case may be, the lower part.

The three-dimensional shape of the lower part of the sole may, for example, be formed by molding.

An upper may be affixed with the sole described above to form a finished shoe product. When an upper part of a sole is provided, the step of injecting a fill in between the upper part and lower part of the sole may be performed after the upper, the upper part of the sole and the lower part of the sole are affixed together, or after only the upper part and the lower part of the sole are affixed together. That is, the upper and the sole may be affixed to each other either before or after the fill is injected. The fill to be injected is usually a liquid or a fluid. After being injected into a mold of a desired shape, enclosing the lower and the upper part of the sole, the fill may expand and be cured according to the pre-designed shape of the mold.

It is also possible that the sole is without the upper part. In this case, the fill may be injected directly into the recessed shape formed at the three-dimensionally shaped lower part of the sole. The upper part of the sole and the lower part of the sole with the injected fill are then affixed together. The specific methods for affixing may include, but are not limited to, stitching, adhering, and ultrasonic welding, etc. Where an upper part of the sole is absent, the step of injecting the fill may be performed either before or after the upper and the lower part of the sole are affixed together.

Exemplary embodiments of the present application will be described below in conjunction with the accompanied drawings.

FIGS. 1 to 8 show a sole, a shoe and a shoemaking method according to a first example of a first embodiment of the present application.

As described above, according to an embodiment of the present invention, a fill for forming the midsole is injected in the cavity between the upper part and the lower part of the sole. A midsole thus formed is effectively wrapped around by a "pouch" formed by the upper part and the lower part of the sole together. In this way, the step of aligning a shaped midsole with the upper part and the lower part of the midsole can be avoided.

FIG. 1 shows a material 102 forming a lower part of the sole (or midsole). The lower part of the sole is molded as a three-dimensionally shaped lower part 104 of the sole. Specifically, the material 102 forming the lower part of the sole is placed between an upper mold (male mold) 101 and a lower mold (female mold) 103 to form the lower part 104 of the sole having a particular three-dimensional shape as defined by the space between the upper mold and the lower mold through a molding process under heat and pressure. The upper mold 101 and the lower mold 103 are of a shape corresponding to the desired three-dimensional shape of the sole. The material 102 forming the lower part of the sole may be any material suitable for compression or heat-pressed molding, such as fabric or other flexible materials. The molded or formed lower part 104 of the sole is adapted to wrap around or enclose the fill or fill material to be injected or poured into the molded or formed lower part 104 of the sole.

In one aspect, the fill material of the sole may have a relatively low density so as to reduce the weight of the sole and hence the weight of the shoe. In another aspect, the lower part of the sole (or midsole) may serve as a protecting layer for the fill, so that the sole (or midsole) can become more durable.

Figure 2:
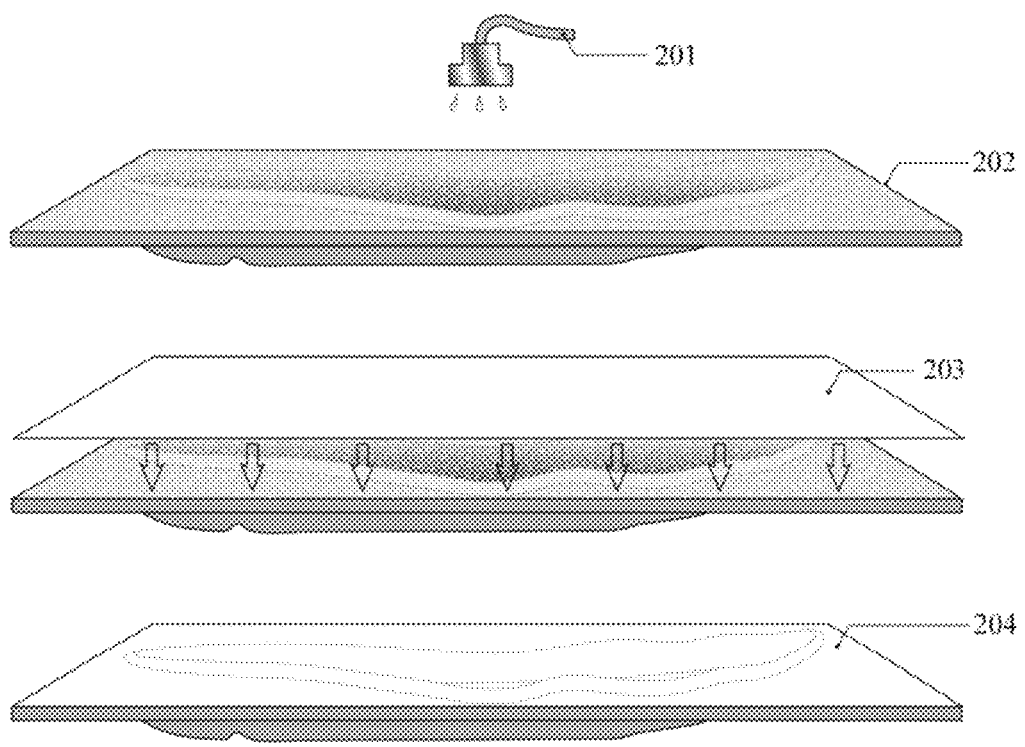
FIG. 2 shows a lower part of a sole provided with a leakage preventing film according to the first example.

FIG. 2 shows an optional leakage preventing layer 203 positioned over the molded lower part 202 of the sole. As illustrated, an adhesive film is formed on the upper side of the formed lower part of the sole 202 by spray coating 201, so that the leakage preventing film 203 is attached to the upper side of the spray coated lower part 202 of the sole. The leakage preventing film 203 may be affixed to the upper side of the lower part 202 of the sole through, for example, vacuum forming, or through other means. A formed lower part 204 of the sole with an affixed leakage preventing film is also shown in FIG. 2. The leakage preventing film may be formed of thermoplastic polyurethane TPU, or other plastics or spray adhesives.

Figure 3:
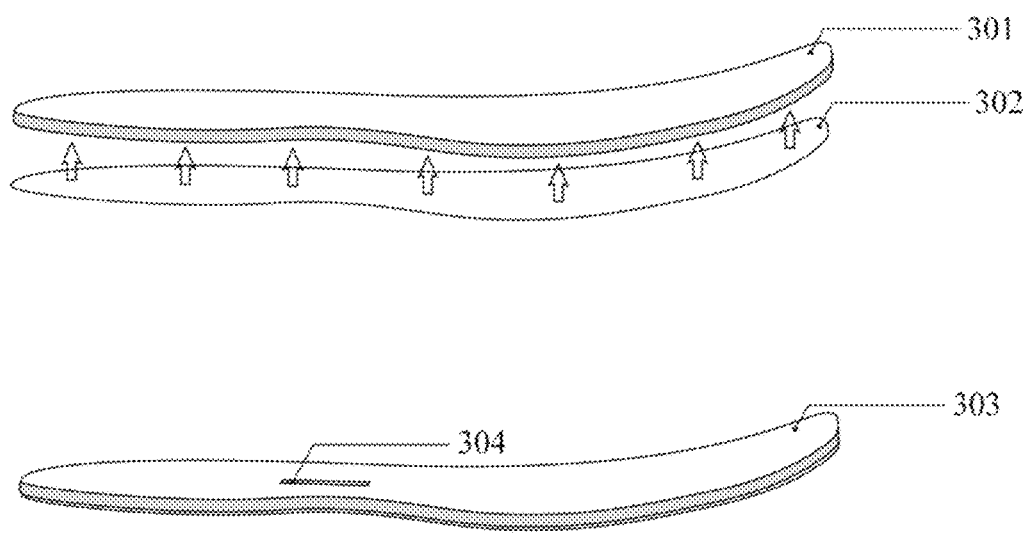
FIG. 3 shows an upper part of a sole according to the first example.

FIG. 3 shows an upper part 301 of the sole (or midsole). The upper part 301 of the sole can be a conventional insole. Alternatively, an additional insole may be further provided besides the upper part 301 of the sole. The upper part 301 of the sole may be formed of a material same as or different from that for the lower part of the sole. For example, the upper part 301 may be formed of a fabric same as or different from the lower part of the sole, or may also be formed of other suitable material. In one embodiment, a leakage preventing film 302 may be adhered to a lower side of the upper part 301 of the sole. The leakage preventing film 302 may be attached to the lower side of the upper part 301 of the sole through, for example, vacuum forming, or through other means. An upper part 303 of the sole with an affixed leakage preventing film is also shown in FIG. 3. The leakage preventing film to be used may be formed of thermoplastic polyurethane TPU or other plastics. FIG. 3 further shows an opening 304 provided in the upper part 303 of the sole. The filling material may be injected or poured through the opening 304.

Figure 4:
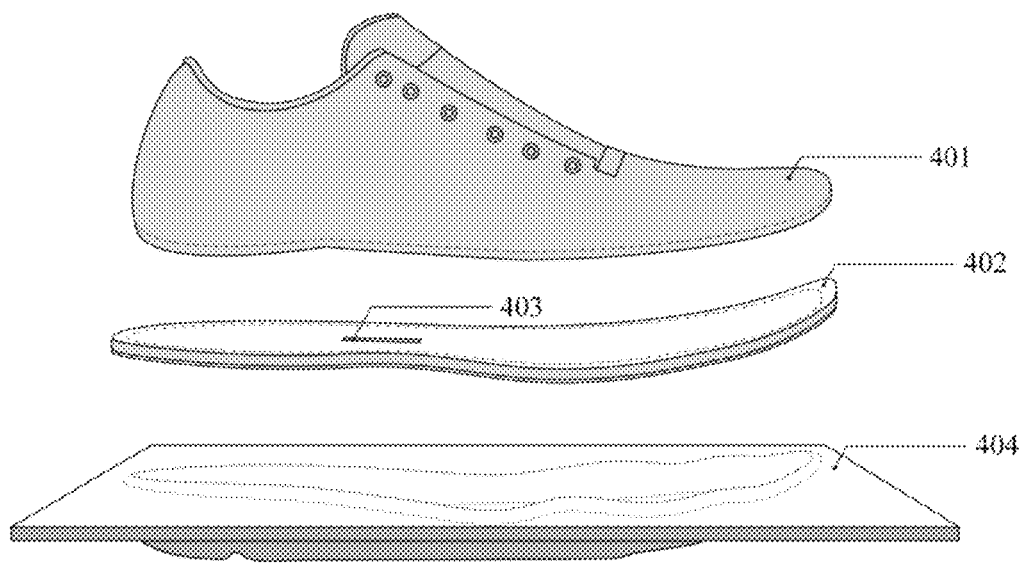
FIG. 4 shows a upper of a shoe, the upper part and the lower part of the sole according to the first example.

FIG. 4 shows an upper 401, an upper part 402 of the sole (or midsole) provided with an opening 403 and a lower part 404 of the sole (or midsole) which is of a three-dimensional shape. As illustrated, the upper 401, the upper part 402 of the sole provided with an opening 403 and the three-dimensionally shaped lower part 404 may be stitched together along the dashed line. The aforementioned three parts may be affixed together by other suitable means. For example, they may be adhered together by adhesives, or by ultrasonic welding.

Figure 5:
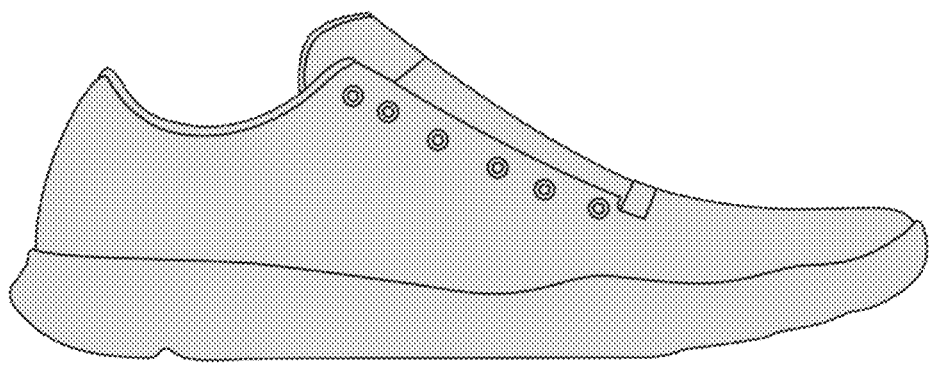
FIG. 5 shows a shoe body according to the first example.

FIG. 5 shows a shoe body formed by affixing the upper, the upper part and the lower part of the sole (or midsole) together.

Figure 6:
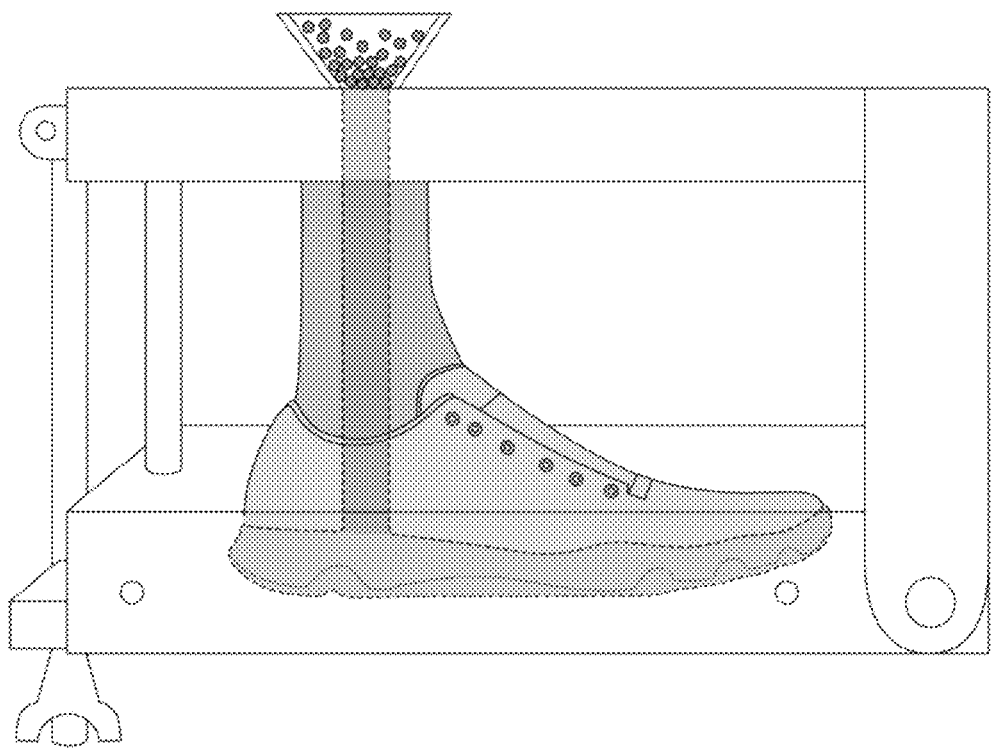
FIG. 6 shows a diagram of injecting a fill according to the first example.

FIG. 6 shows the step of injecting the fill into the shoe body shown in FIG. 5 through the opening 403 in the upper part of the sole (or midsole). The fill is injected into the cavity between the upper part 402 and the lower part 404 of the sole through the opening in the upper part of the sole. When a leakage preventing film is provided, the fill is injected into the cavity between the leakage preventing film affixed to a lower surface of the upper part of the sole and the leakage preventing film affixed to an upper surface of the lower part of the sole through the opening in the upper part of the sole. The fill injected may be a liquid or a fluid. The fill injected into the cavity is allowed to expand and be cured in the cavity according to a pre-determined shape of the cavity. The shape of the injected fill, and the shape of the "pouch" which is formed between the upper part (or the leakage preventing film affixed to the upper part) and the lower part (or the leakage preventing film affixed to the lower part) of the sole (or midsole) and which is filled with the fill, is defined by the pre-determined shape of the upper mold and the lower mold. The material of the injected fill may preferably be a thermoset material such as polyurethane or polyurethane foam. According to an embodiment, the main material of the injected fill may be polyether polyols and polyisocyanates (MDI).

The polyurethane foam used for the fill may for example be a multicomponent polyether composition comprising cold curing components A and B, such as polyether polyol and polyisocyanate (MDI), and the polyether polyol may be TMD-5000 from Third Petrochemical Industry of Tianjin, while the polyisocyanates (MDI) may be PAPI-27 from Dow Chemical Co. The equipment employed may for example be a low-pressure reaction injection molding machine.

The injection molding process generally includes material charging, material injection, curing, demoulding, trimming, and post curing, etc.

During the charging process, vent valves of material tanks A and B are opened first. Feeding valves are opened after the needle of low-pressure gauge of each of the material tanks A and B returns to zero, and closed after a predetermined amount of components A and B are charged. Once the charging of components A and B is complete, the vent valves are closed and the low-pressure of tanks A and B is controlled to be not less than 0.2 Mpa.

During the injection process, a mold temperature shall be controlled. Specifically, an electrical heating water tank is launched for heating the mold with the water temperature in a range of 80-95° C., the light foam mold temperature in a range of 45±3° C., and the self-suction foam mold temperature in a range of 58±3° C. Under such environmental condition, the equipment is turned on and adjusted to normal production state, and the material temperature should be controlled in a range of 25-28° C. The ratio of materials A and B, for example, may be set as 100 to 52, which may be tracked through a gauge showing the rotational rates of tanks A and B at a control unit of the low-pressure reaction injection molding machine. Injection then follows.

After the material injection is complete, curing is performed under controlled mold temperature. In an exemplary embodiment, curing time is not less than 4 minutes. After curing is complete, demoulding and trimming may be performed. The resulting product may be further cured at room temperature for a period of at least 12 hours.

Figure 7:
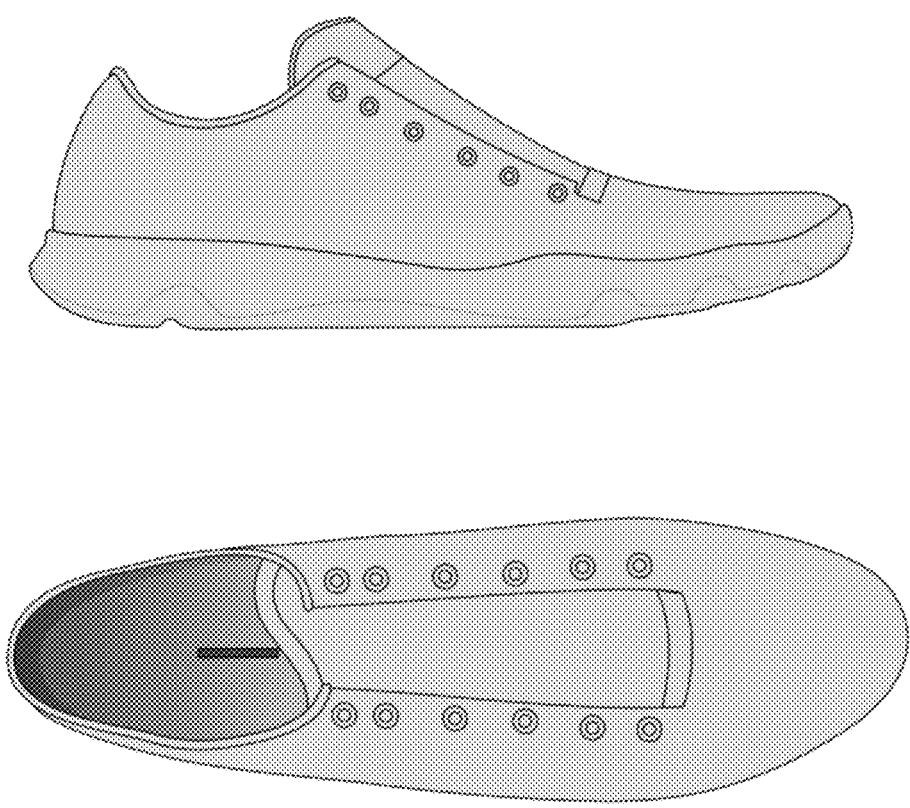
FIG. 7 shows a shoe body with the fill injected according to the first example.

FIG. 7 shows a shoe body formed after the fill has been injected and cured. As illustrated, the opening through which the fill is injected is still found in the upper part of the sole.

Figure 8:
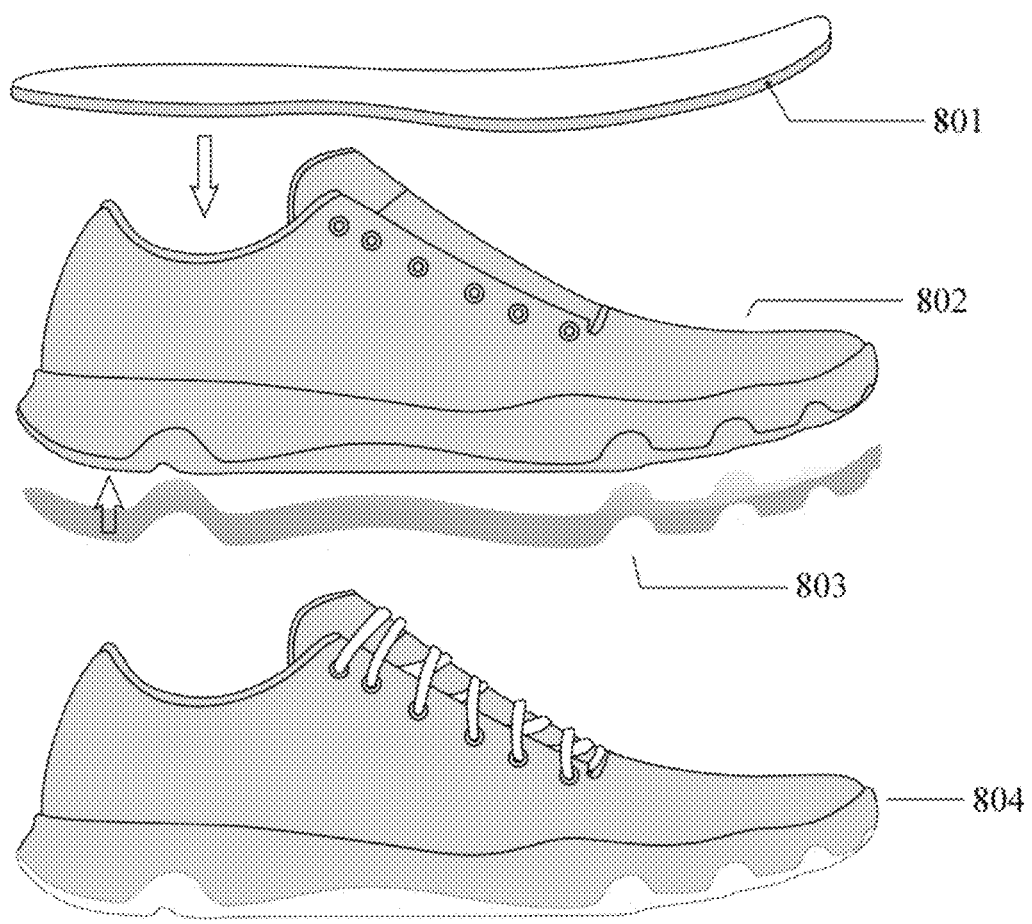
FIG. 8 shows a finished shoe product according to the first example.

FIG. 8 shows a finished shoe product including the shoe body 802 after injection of the fill, an outsole 803 attached to the bottom of the shoe body 802, and an insole 801 placed over the midsole.

FIGS. 9 to 12 show a sole (or midsole), a shoe and a method for making a shoe according to a second exemplary example of the first embodiment of the present application. This example differs from the first example in that the opening for injecting the fill is located in the lower part of the sole.

For the sake of simplicity, the same parts as in the first example will not be further described below, and the corresponding drawings will not be shown in duplicate (FIGS. 1, 2, 4 and 8 are also applicable to the second example).

Figure 9:
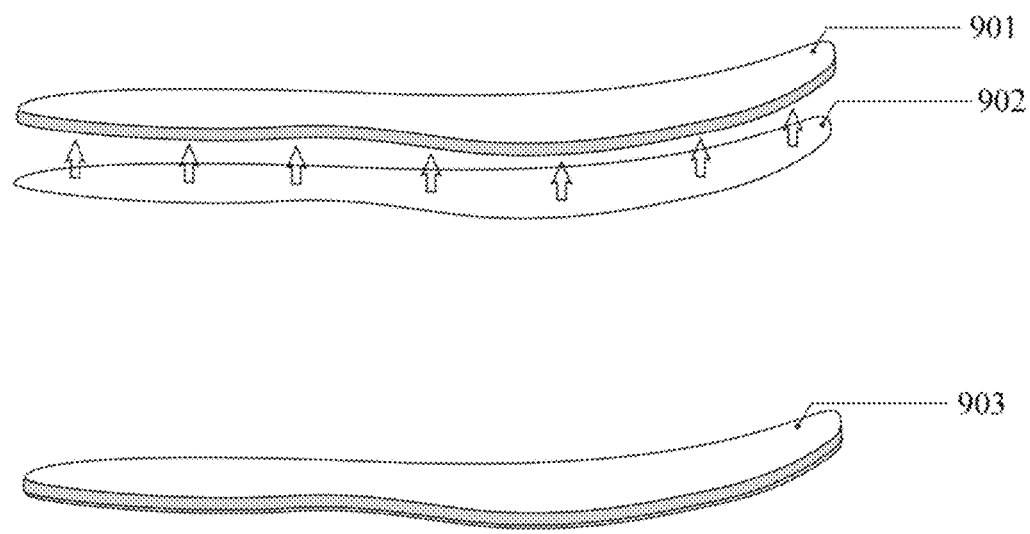
FIG. 9 shows an upper part of a sole according to a second example of the first embodiment.

FIG. 9 shows the upper part 901 of the sole (or midsole), in which no opening is provided. A leakage preventing film 902 may optionally be affixed to a lower side of the upper part 901 of the sole. The leakage preventing film 902 may be affixed to the upper part 901 of the sole by vacuum forming, or by other means. The leakage preventing film may be of thermoplastic polyurethane TPU, or may be of other plastics. FIG. 9 further shows an upper part 903 of the sole with a leakage preventing film affixed to its upper side.

Figure 10:
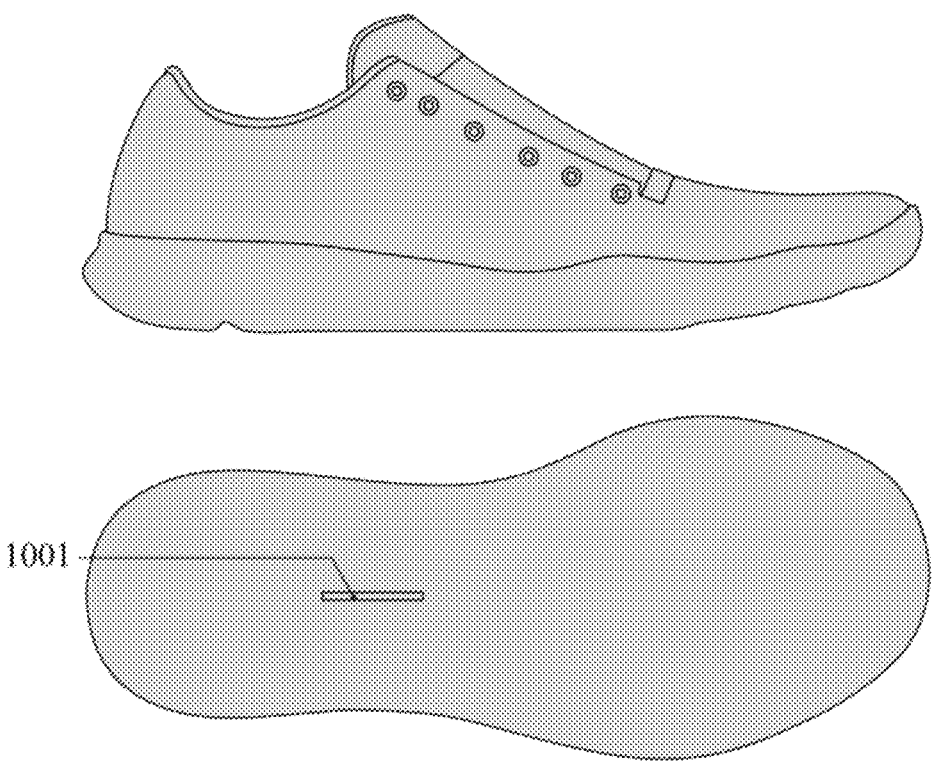
FIG. 10 shows a shoe body according to the second example.

FIG. 10 shows a shoe body formed by affixing an upper, the upper part and the lower part of the sole (or midsole) together. As illustrated in FIG. 10, an opening 1001 is provided in the lower part of the sole. This opening is to allow the fill to be injected through it into the cavity formed between the upper part and the lower part of the sole (or midsole).

Figure 11:
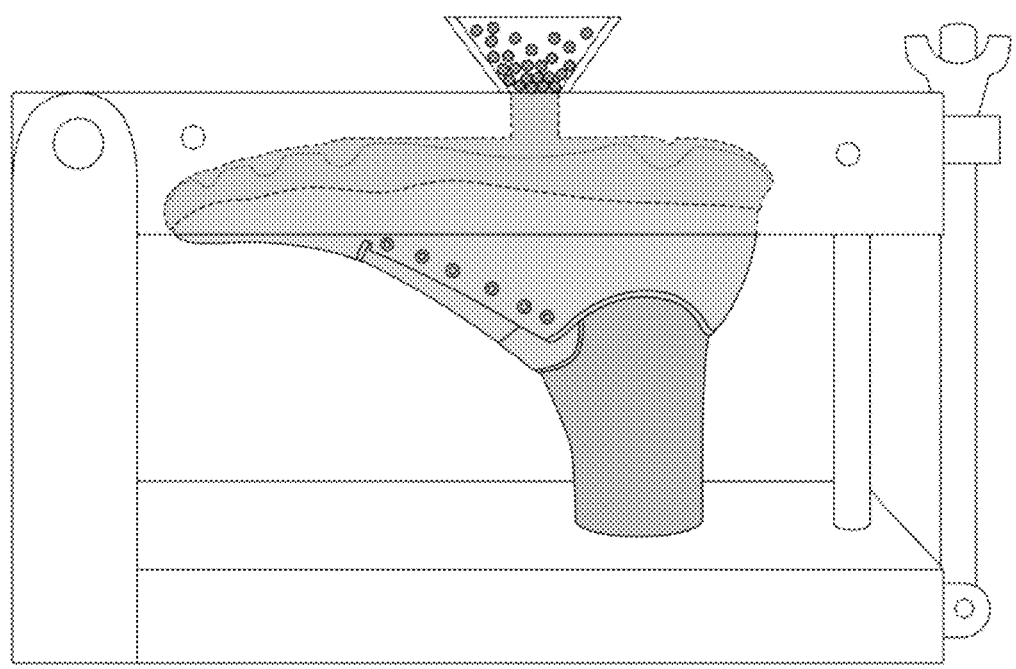
FIG. 11 shows a diagram of injecting a fill according to the second example.

FIG. 11 shows the step of injecting the fill into the shoe body shown in FIG. 10 through the opening in the lower part of the sole (or midsole).

Figure 12:
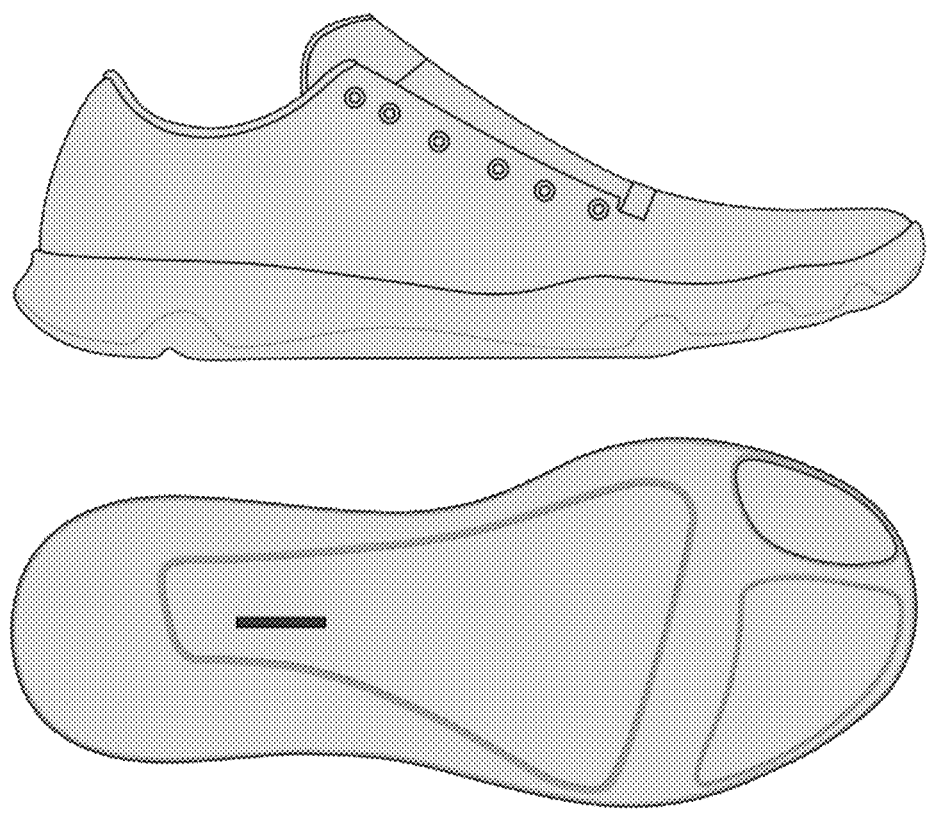
FIG. 12 shows a shoe body with the fill injected according to the second example.

FIG. 12 shows the shoe body formed with the fill injected. As can be seen, the opening through which the fill is injected is still found in the lower part of the sole (or midsole).

Figure 13:
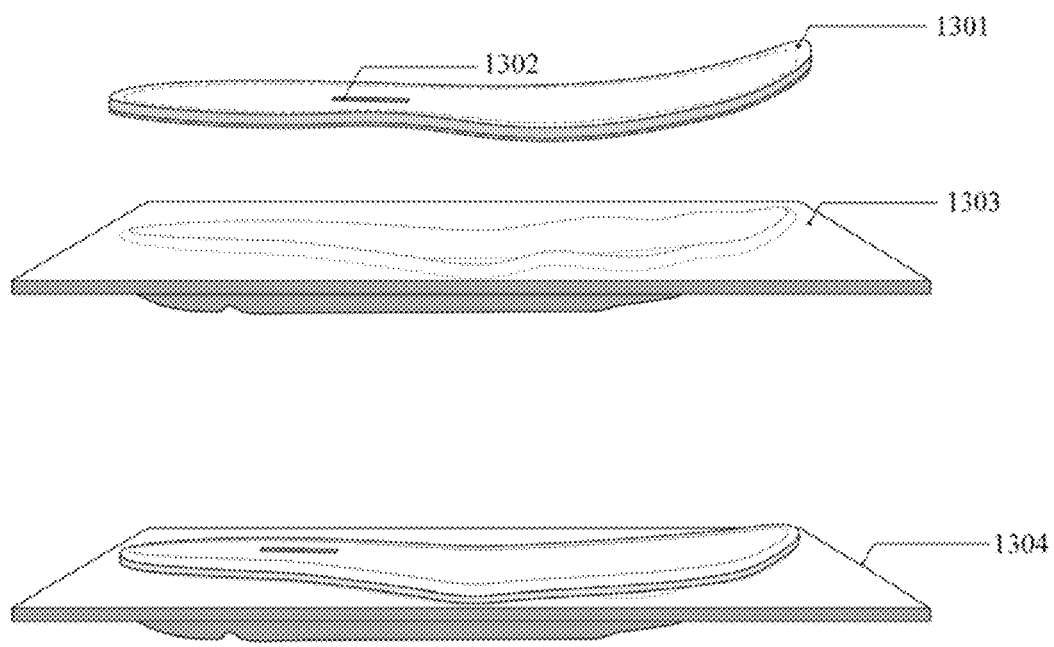
FIG. 13 shows an upper part and a second part of a sole according to a third example of the first embodiment.
Figure 14:
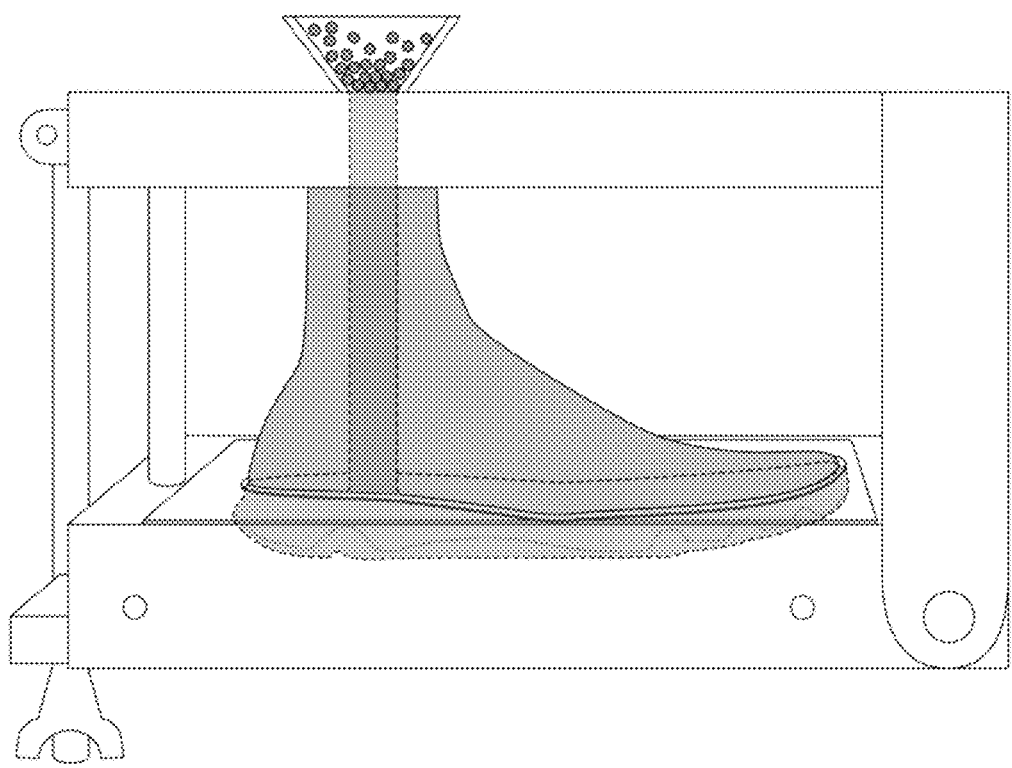
FIG. 14 shows a diagram of injecting a fill according to the third example.
Figure 15:
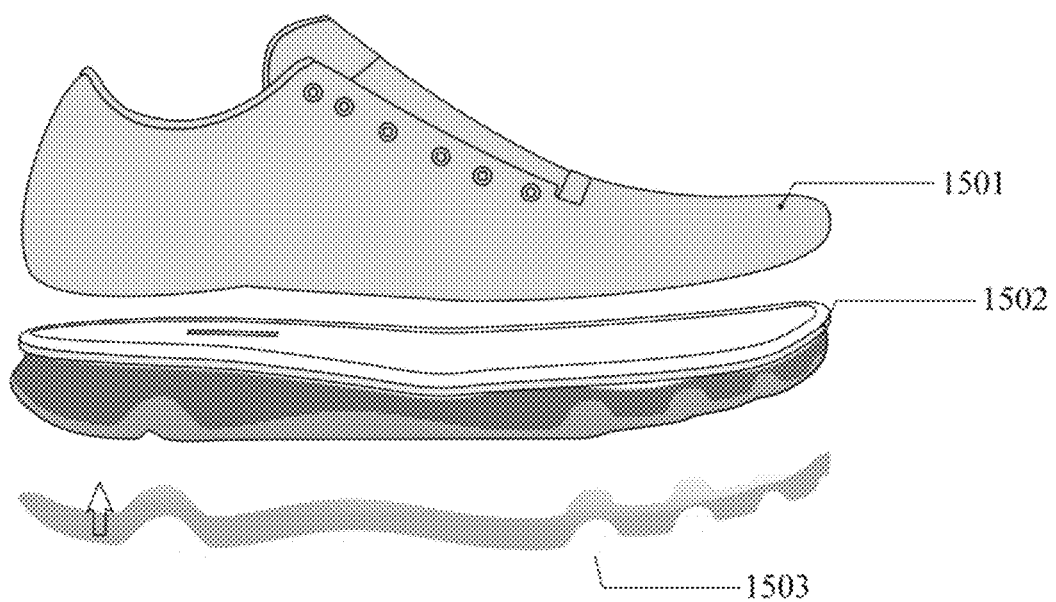
FIG. 15 shows a upper of a shoe, a sole and an outsole according to the third example.

FIGS. 13 to 15 show a sole, a shoe and a method for making a shoe according to a third exemplary example of the first embodiment. This example differs from the first example in that, the injection molding processing of the fill is performed after affixing the upper part of the sole (or midsole) to the lower part of the sole (or midsole), and the upper of the shoe is affixed to the sole (or midsole) after the injection molding is complete.

For the sake of simplicity, the parts in this example that are the same as those in the first example will not be further described below, and the corresponding drawings will not be shown in duplicate (FIGS. 1, 2, 4 and 8 are also applicable to the third example).

As illustrated in FIG. 13, an upper part 1301 of the sole provided with an opening 1302 is affixed to a three-dimensionally shaped lower part 1303 of the sole by stitching along the dashed line. It should be understood that the affixing may be by other suitable means, for example by adhesives or ultrasonic welding. FIG. 13 further shows a sole (or midsole) 1304 formed by affixing the upper part 1301 to the the lower part 1303 of the sole.

FIG. 14 illustrates the step of injecting the fill into the sole (or midsole) shown in FIG. 13 through the opening in the upper part of the sole. It should be noted that during the injection process, the upper has not yet been affixed to the sole (or midsole).

FIG. 15 shows the sole (or midsole) 1502 after the injection molding process is complete. An upper 1501 is then affixed to the sole (or midsole) on the upper side, and an outsole 1503 may also be affixed to the sole (or midsole) on the lower side. The affixing may be done using adhesives, or by using other suitable means.

Figure 16:
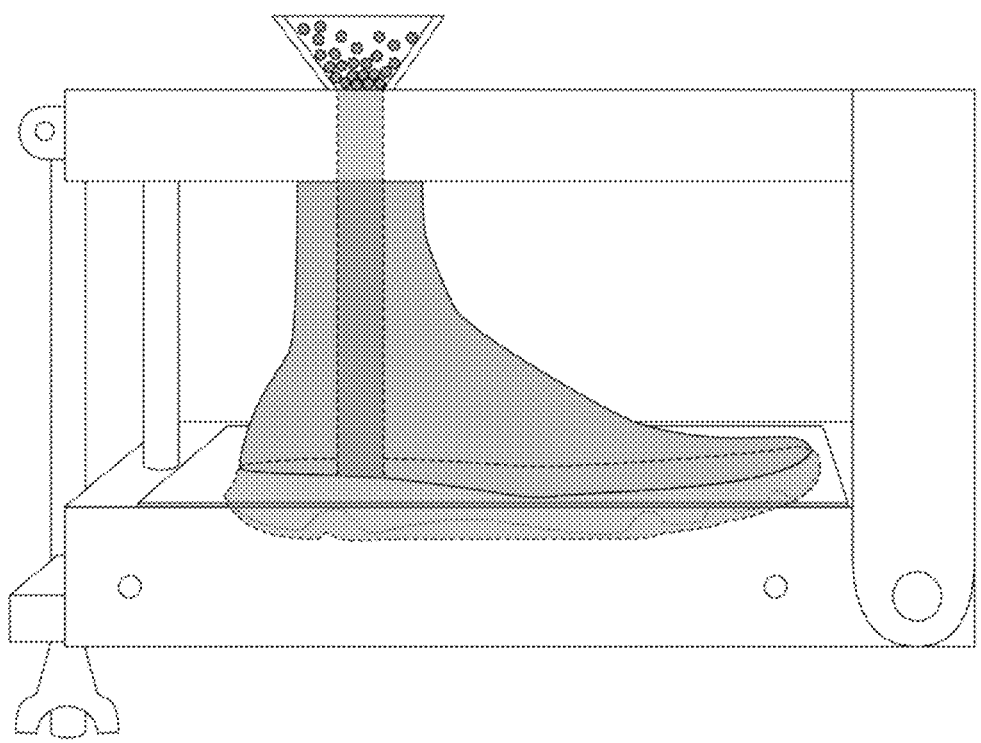
FIG. 16 shows a diagram of injecting a fill according to a fourth example of the first embodiment.
Figure 17:
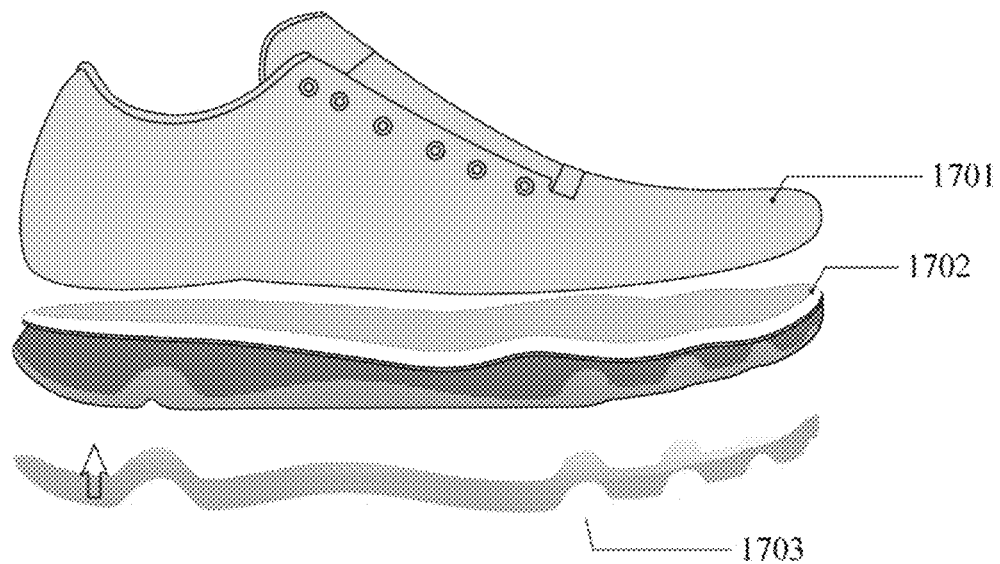
FIG. 17 shows a upper, a sole and an outsole according to the fourth example.

FIGS. 16 and 17 show a sole, a shoe and a method for making a shoe according to a fourth exemplary example of the first embodiment of the present application. This example differs from the former three examples in that an independent upper part of the sole is not provided.

As illustrated in FIG. 16, the injection molding is performed directly in the lower part of the sole (or midsole) which has a three-dimensional shape.

FIG. 17 shows the sole (or midsole) 1702 formed after the injection molding process is complete. The sole (or midsole) is then affixed with a upper 1701 on the upper side and an outsole 1703 on the lower side. The upper surface of the molded sole (or midsole) 1702 is formed after the injected fill has cured, and a separate upper part as used in the previous examples is not present in the example illustrated in FIG. 17.

FIGS. 18 to 29 show a sole (or midsole), a shoe and a method for making a shoe according to a fifth exemplary example of the first embodiment. This example differs from the first example in that, the upper part of the sole (or midsole) is of a shape corresponding to the shape of at least a portion of the lower part of the sole (or midsole), and both the lower part and the upper part of the sole (or midsole) include at least a portion of the back or heel portion of the shoe. In particular, the back or heel portion of the upper part of the sole (or midsole) is of a shape that matches the shape of the back or heel portion of the lower part of the sole (or midsole). As the upper part and the lower part of the sole are affixed to each other, they form a sole (or midsole) that includes at least a portion of the back or heel portion.

Figure 18:
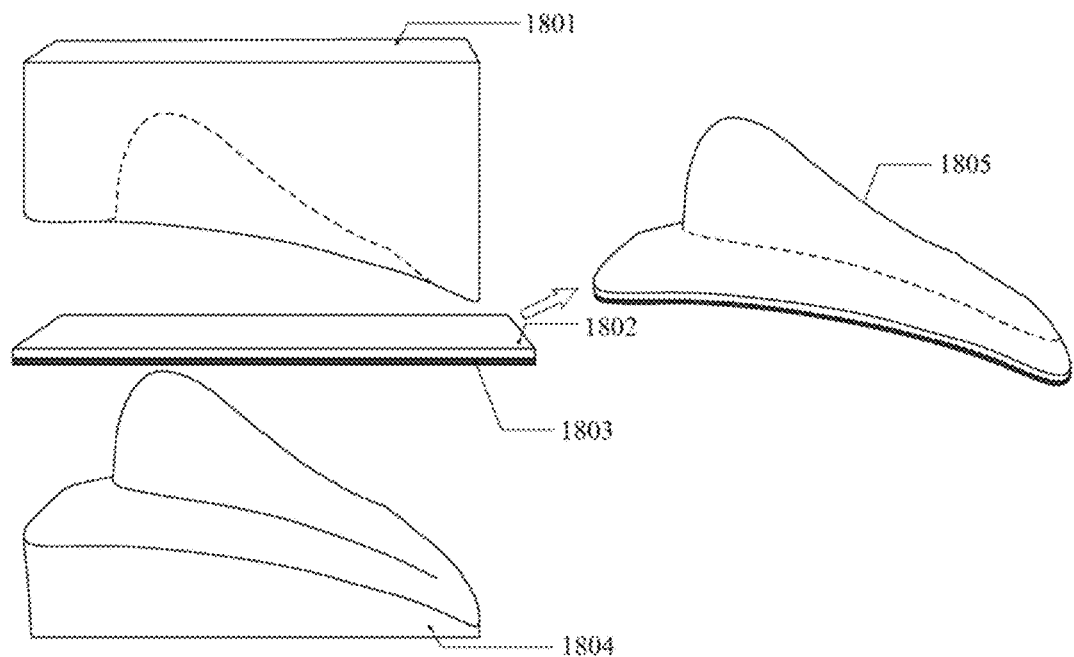
FIGS. 18, 19 and 20 show an upper part of a sole according to a fifth example of the first embodiment.
Figure 19:
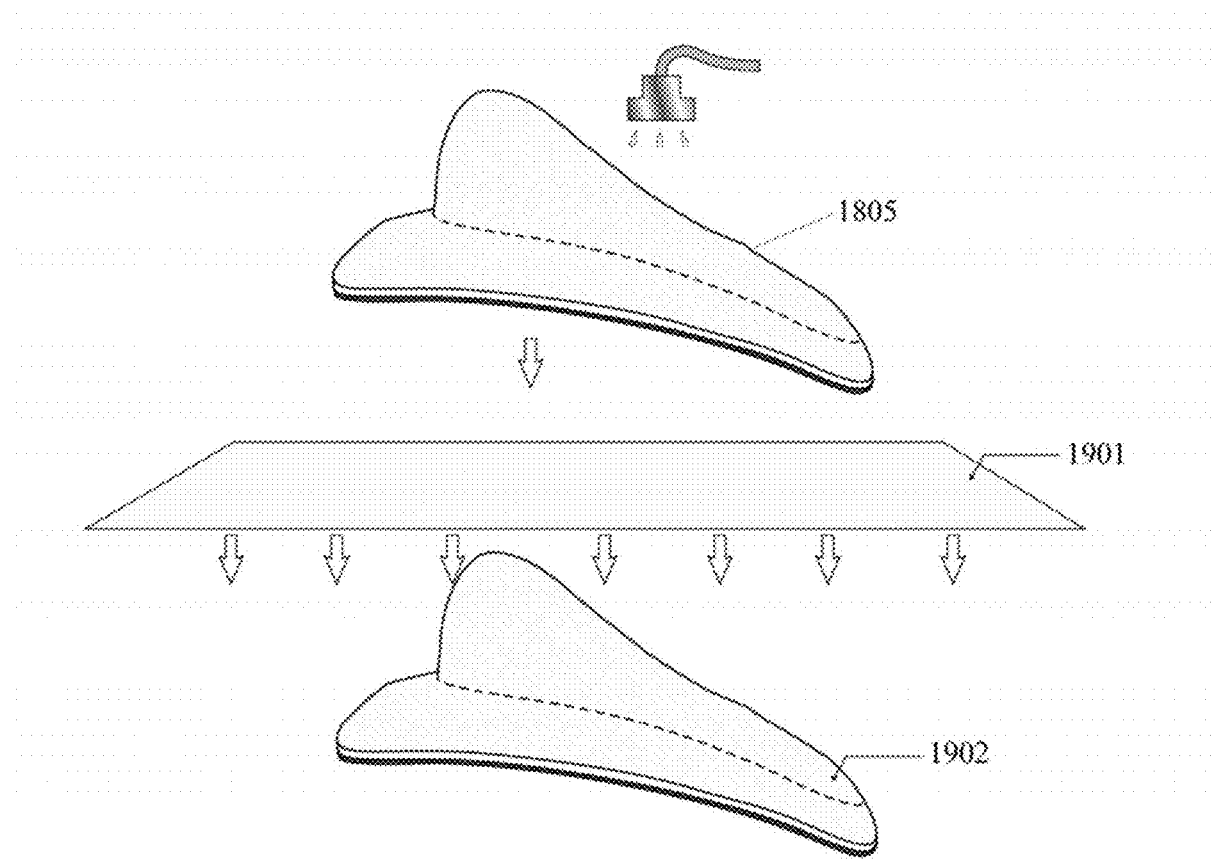
Figure 20:
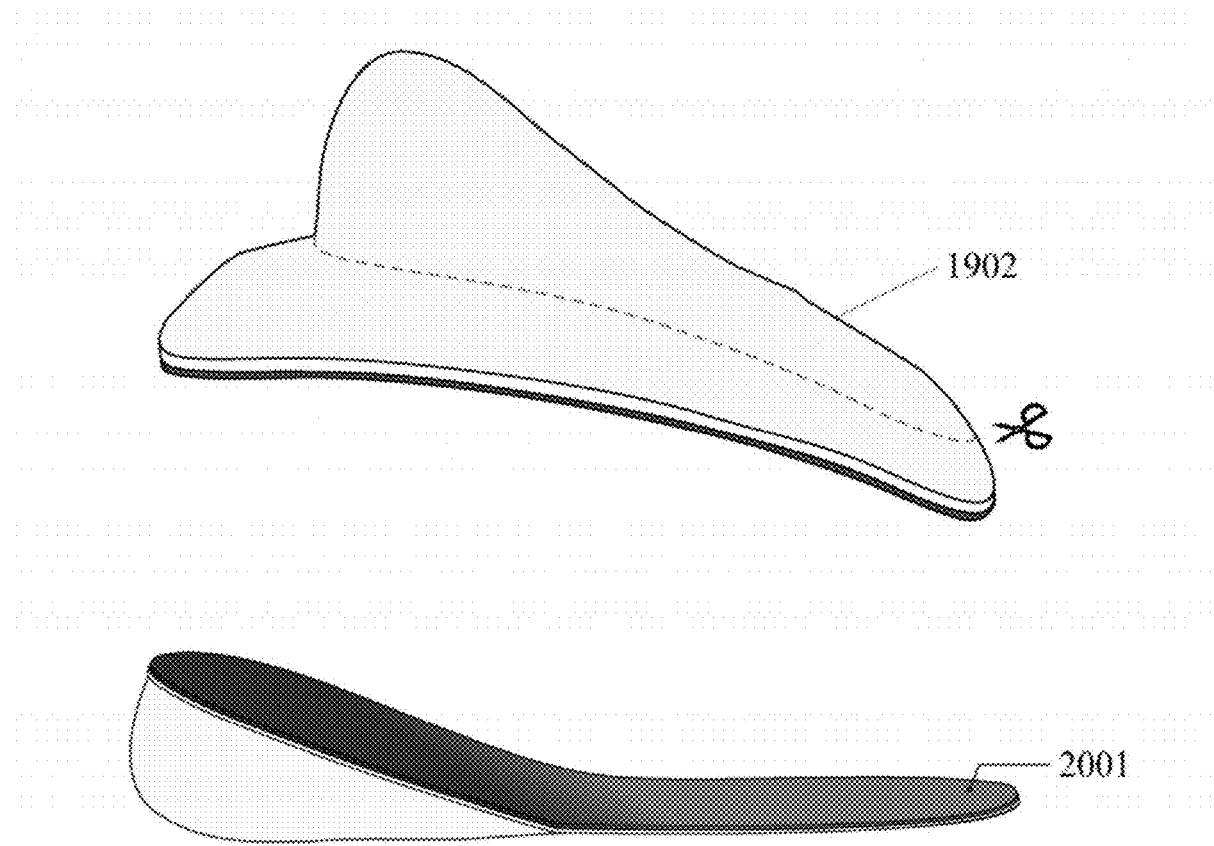

FIGS. 18, 19 and 20 show the forming of an upper part of the sole (or midsole) according to the fifth example. As illustrated in FIG. 18, the layer of material forming the upper part of the sole is disposed between an upper mold (female mold) 1801 and a lower mold (male mold) 1804, and an upper part 1805 of the sole having a pre-determined three-dimensional shape is formed by molding under heat and pressure between the upper mold and the lower mold. The layer of material layer may comprise a foam layer 1802 and a fabric layer 1803. As further illustrated in FIG. 19, a leakage preventing film 1901 is affixed, for example by adhesive spraying, to a lower side of the upper part 1805 of the sole to form an upper part 1902 of the sole with a leakage preventing film attached. Alternatively, the leakage preventing film 1901 may be attached to the lower side of the upper part 1805 of the sole by vacuum forming. FIG. 20 shows an upper part 2001 of the sole formed by trimming the upper part 1902 of the sole with the leakage preventing film affixed to its lower side. As shown in FIG. 20, the trimmed upper part of sole includes a portion of the back or heel portion.

Figure 21:
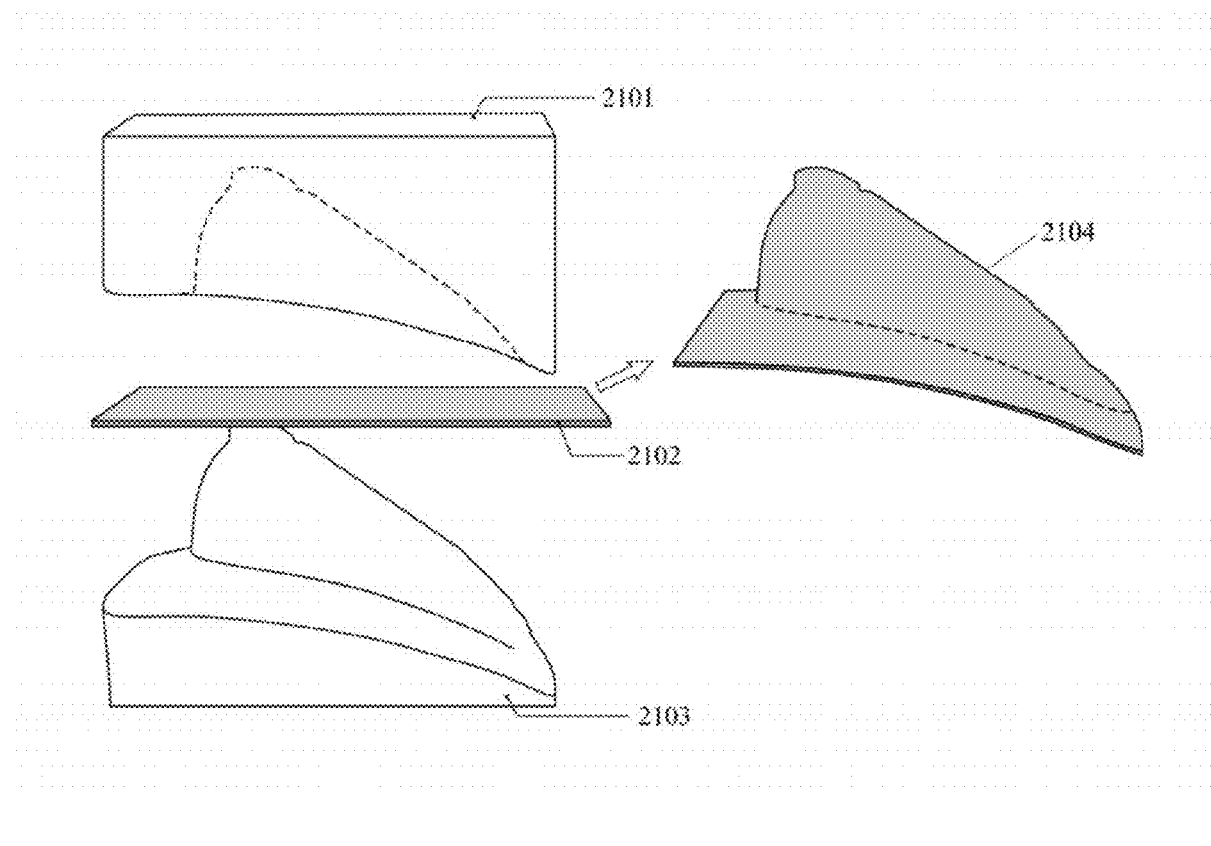
FIGS. 21, 22 and 23 show a lower part of a sole according to the fifth example.
Figure 22:
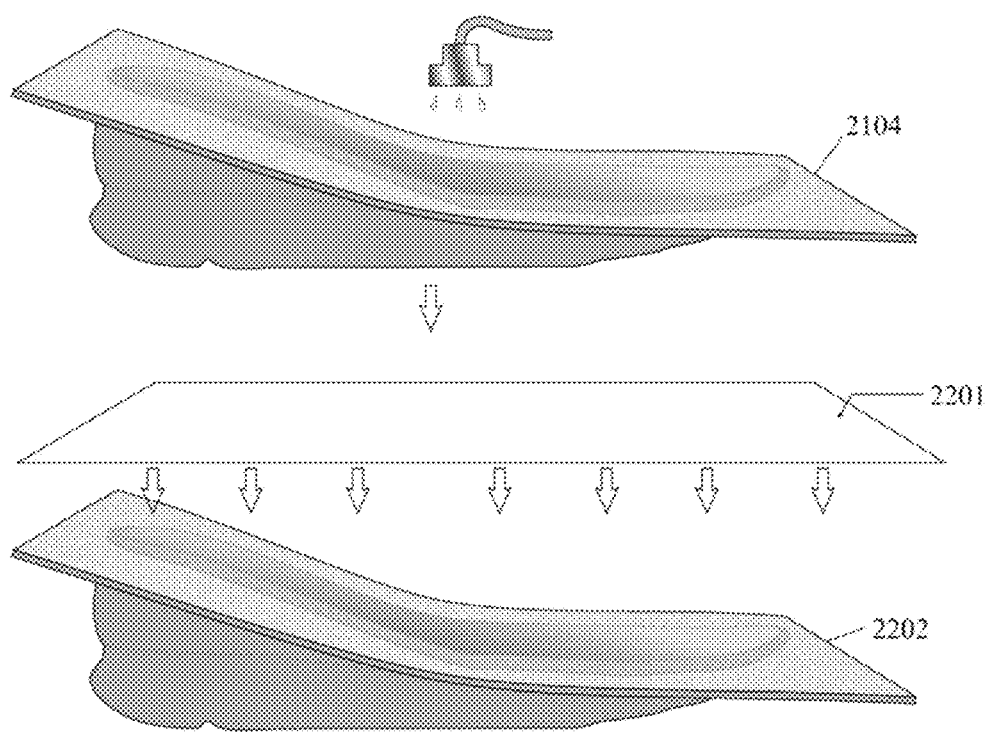
Figure 23:
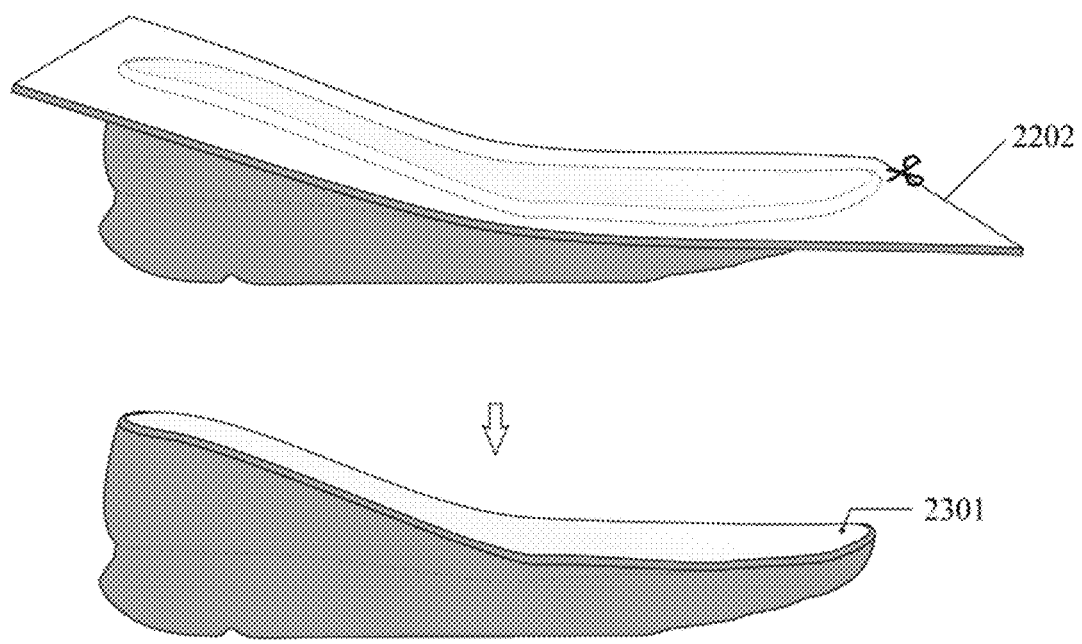

FIGS. 21, 22, and 23 show a lower part of the sole (or midsole) according to the fifth example. As illustrated in FIG. 21, the layer of material 2102 forming the lower part of the sole is disposed between an upper mold (female mold) 2101 and a lower mold (male mold) 2103, and a lower part 2104 of the sole having a pre-determined three-dimensional shape is formed by molding the material layer 2102 under heat and pressure between the upper mold and the lower mold. The formed lower part 2104 of the sole may also include a portion of the back or heel portion. Also, the formed lower part of the sole is of a three-dimensional shape corresponding to the formed upper part of the sole. FIG. 22 shows that a leakage preventing film 2201 is affixed to an upper side of the formed lower part 2104 of the sole, for example by adhesive spraying, to form a lower part 2202 of the sole with a leakage preventing film attached. The leakage preventing film 2201 may alternatively be attached to the upper side of the lower part 2104 of the sole by vacuum forming. FIG. 23 shows a lower part 2202 of the sole with the leakage preventing film attached to its upper side, and a trimmed lower part 2301 of the sole.

Figure 24:
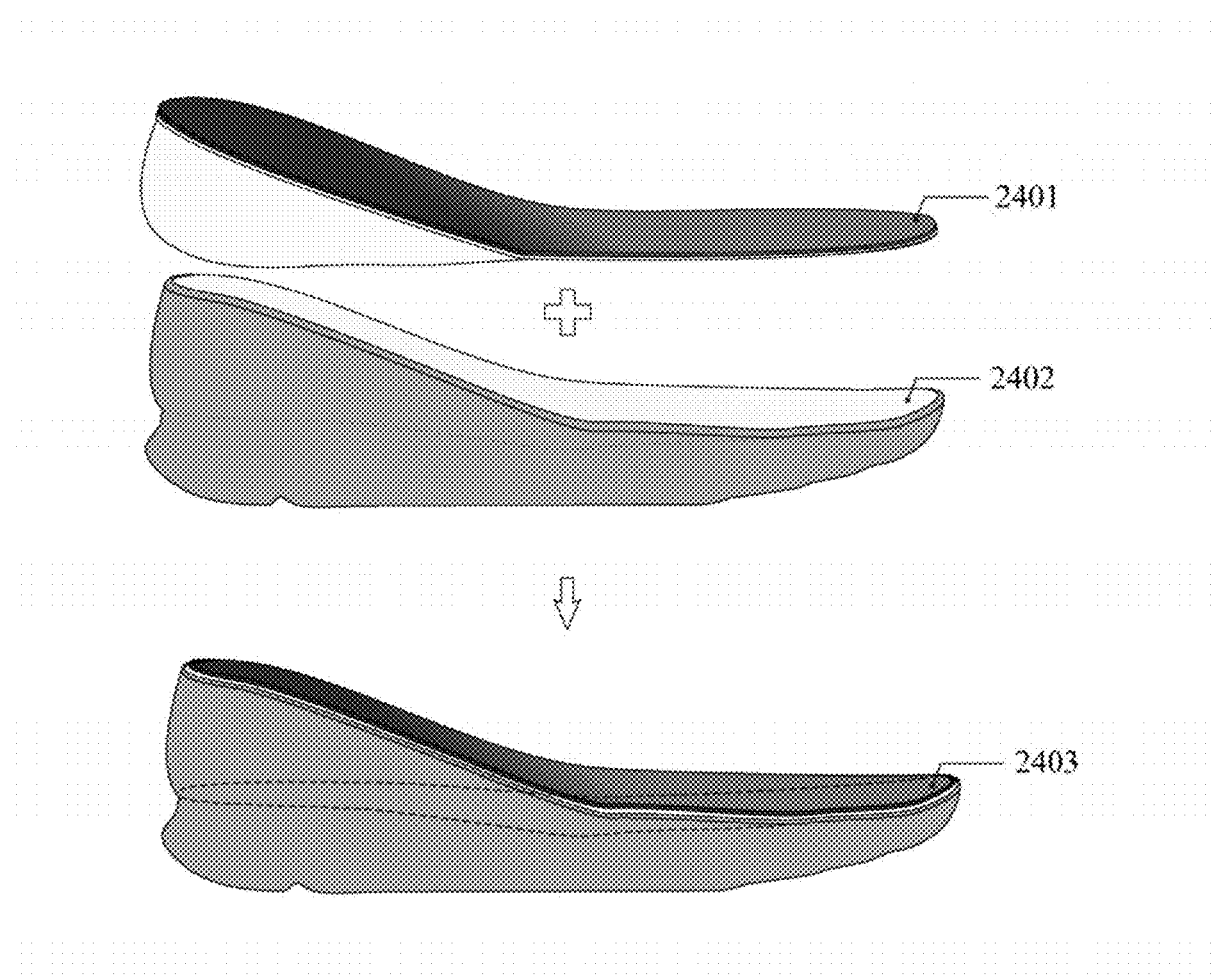
FIG. 24 shows the upper part and the lower part of the sole according to the fifth example.

FIG. 24 shows the trimmed upper and lower part of the sole (or midsole) according to the fifth example. As shown in FIG. 24, the upper part 2401 of the sole is received in the three-dimensionally shaped lower part 2402 of the sole and is of a shape corresponding to the shape of the lower part 2402 of the sole. A sole (or midsole) 2403 is formed by affixing the lower part and the upper part of the sole together, wherein a cavity is formed in between the lower part and the upper part of the sole. This cavity will allow a fill to be injected into the cavity to form the finished sole (or midsole).

Figure 25A:
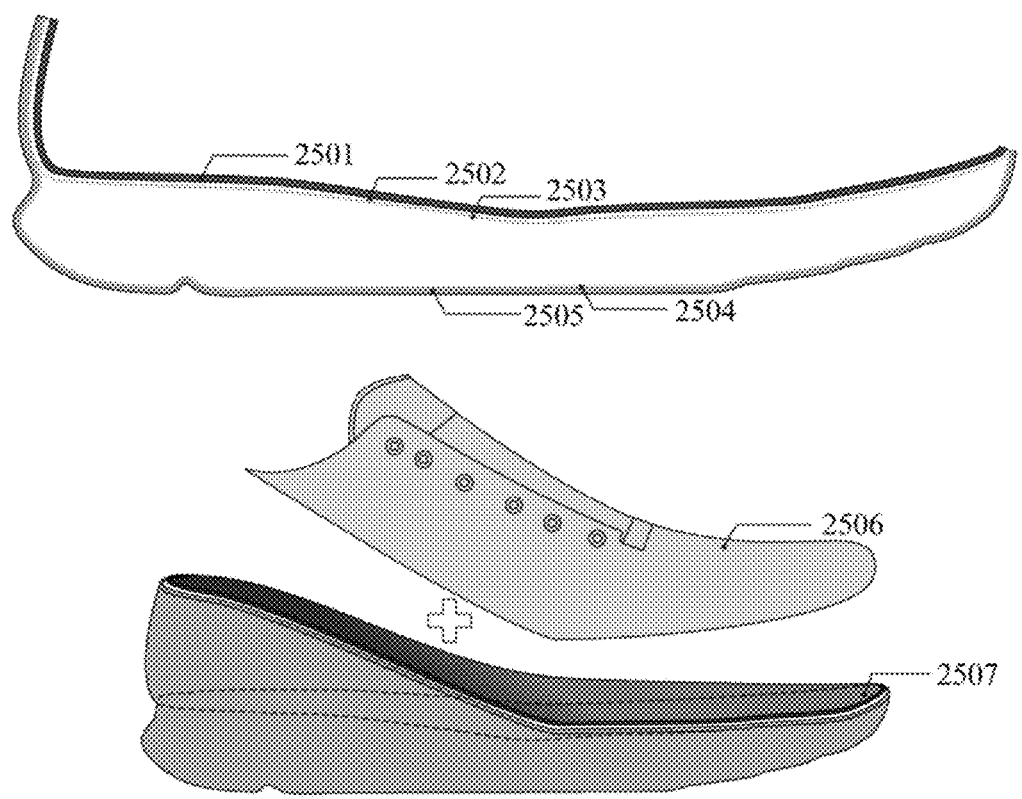
FIG. 25A shows a upper, the upper part and the lower part of the sole according to the fifth example.
Figure 25B:
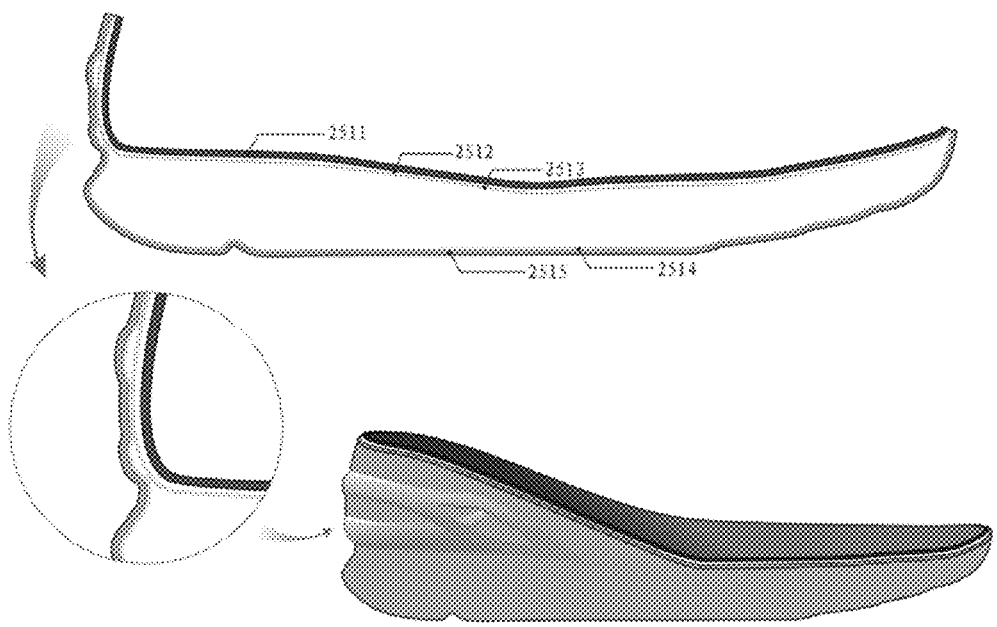
FIG. 25B shows a upper, an upper part and a lower part of a sole of a variant according to the fifth example.

FIG. 25A shows an upper, an upper part and a lower part of the sole (or midsole). As shown, the upper part of the sole received in the lower part of the sole includes, from top to bottom in sequence, a fabric layer 2501, a foam layer 2502, and a leakage preventing film 2503. The lower part of the sole includes, from top to bottom in sequence, a leakage preventing film 2504 and a fabric layer 2505. Between the upper leakage preventing film 2503 and the lower leakage preventing film 2504 is the cavity into which a fill is to be injected. An upper 2506 to be attached to the sole (or midsole) is of a shape corresponding to the upper edge of the sole (or midsole) 2507 formed by affixing the lower part of the sole to the upper part of the sole. Alternatively, in this example, as is shown in FIG. 25B, the cavity into which a fill is to be injected may extend upward to the portion corresponding to a wearer's heel. The heel portion may be molded into any desirable, for example as shown in FIG. 25B, both to enhance aesthetic appearance and protection for the heel. The upper part of the sole (including the fabric layer 2511, the foam layer 2512, and the leakage preventing film 2513) in FIG. 25B is the same as that in FIG. 25A, and the lower part of the sole (including the leakage preventing film 2514 and the fabric layer 2515) in FIG. 25B differs from the lower part of the sole in FIG. 25A in the shape of the heel portion.

Figure 26:
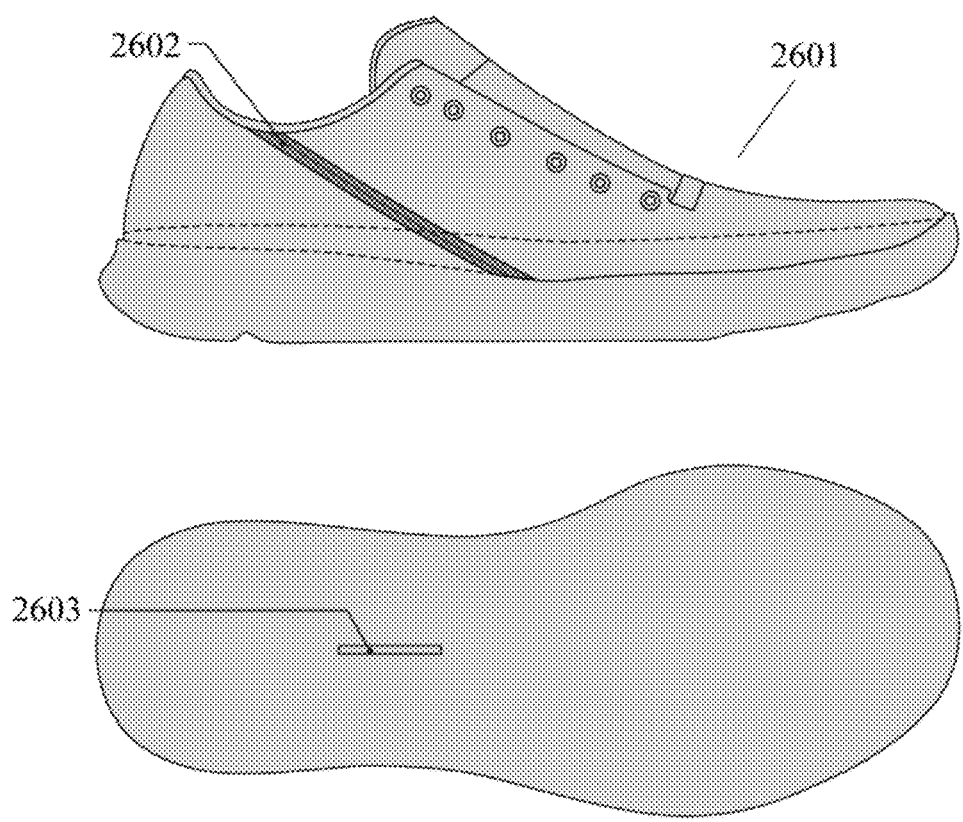
FIG. 26 shows a shoe body according to the fifth example.

FIG. 26 shows a shoe body 2601 formed by attaching the sole (or midsole) having a cavity formed in the manner described above to an upper, for example by adhesive. As shown, the upper comprises a front portion and a back portion, the portions being attached to each other by, for example, stitching. A strip 2602 is used to cover the stitches. IAs shown in FIG. 26, the lower part of the sole comprises an opening 2603. This opening is to allow a fill to be injected into the cavity through the opening.

Figure 27:
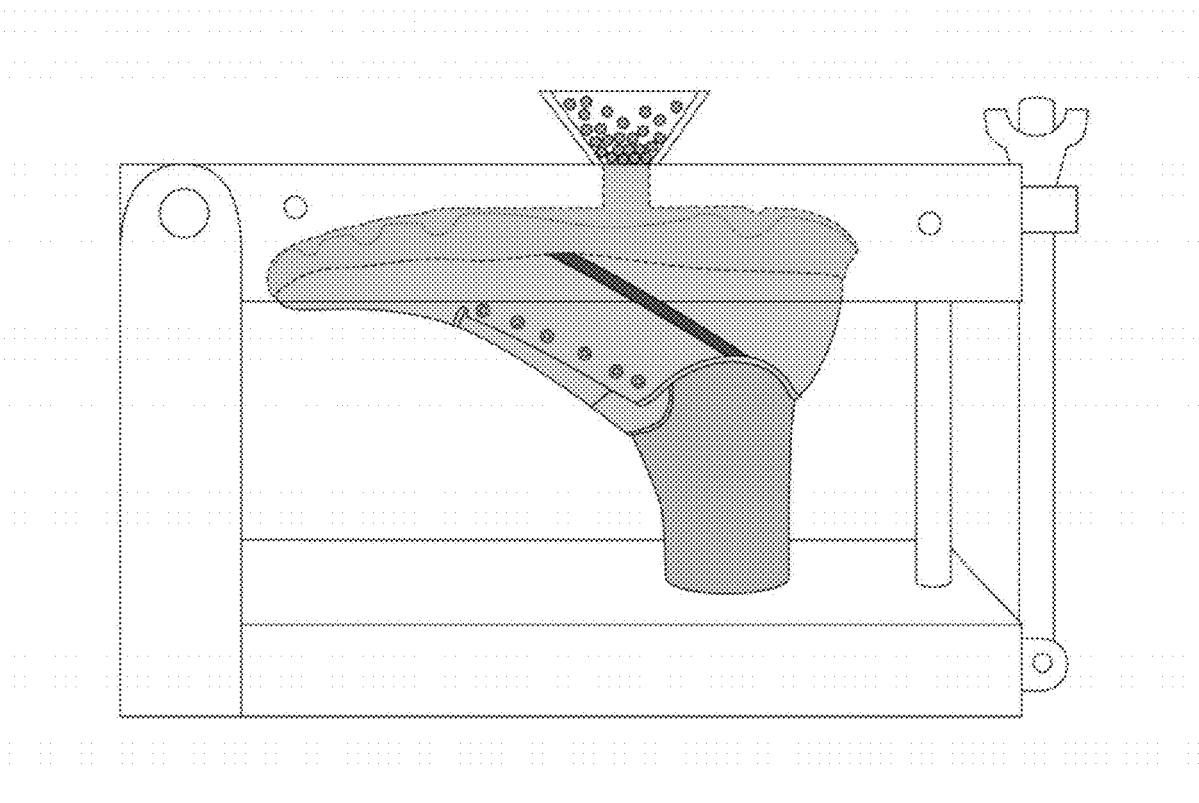
FIG. 27 shows a diagram of injecting a fill according to the fifth example.

FIG. 27 shows the step of injecting the fill according to the fifth example. As shown, the fill is injected in the cavity formed between the lower part and the upper part of the sole (or midsole).

Figure 28:
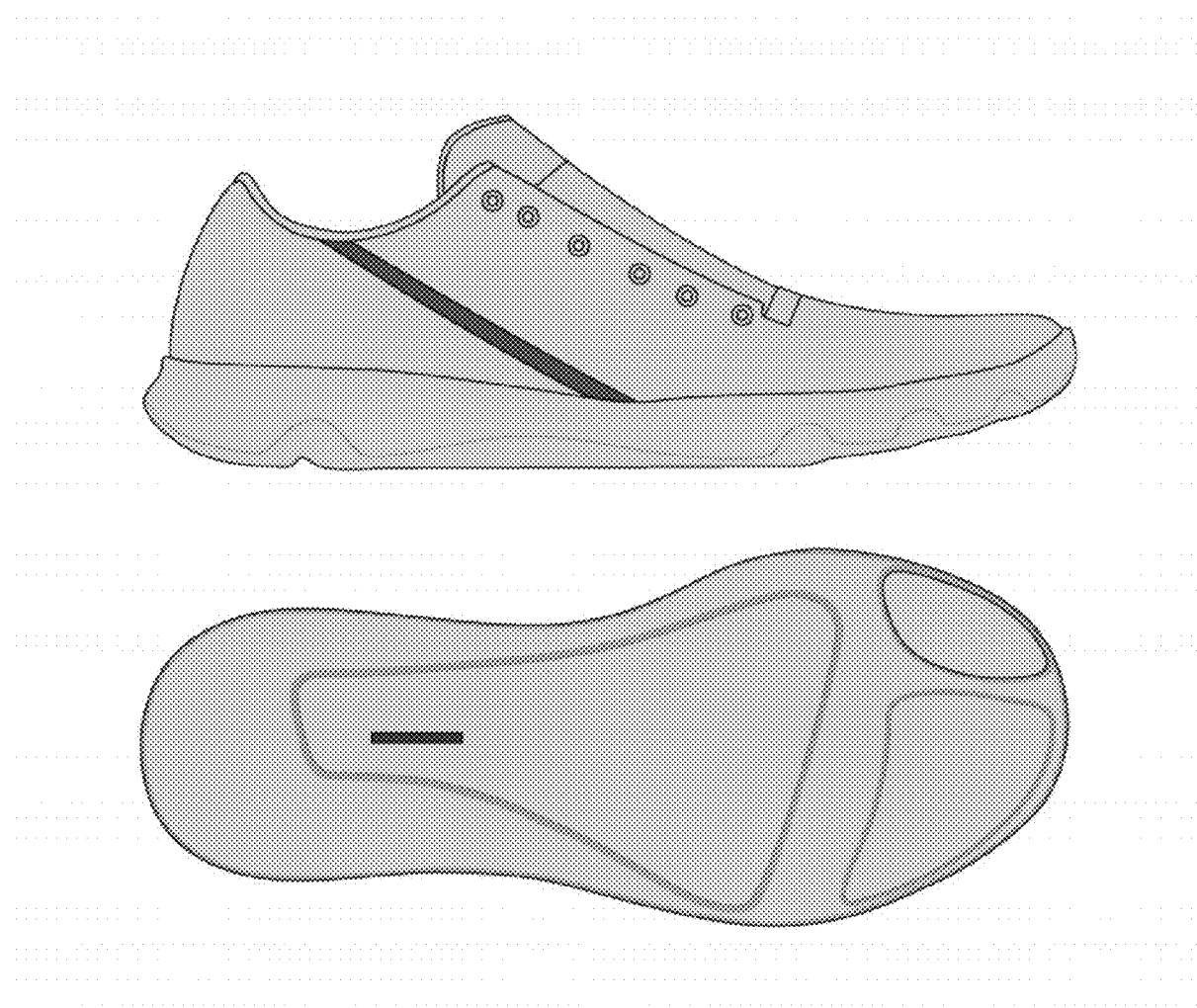
FIG. 28 shows a shoe body with the fill injected according to the fifth example.

FIG. 28 shows a shoe body formed after the injection molding process is complete. As can be seen, an opening remains under the sole (or midsole).

Figure 29:
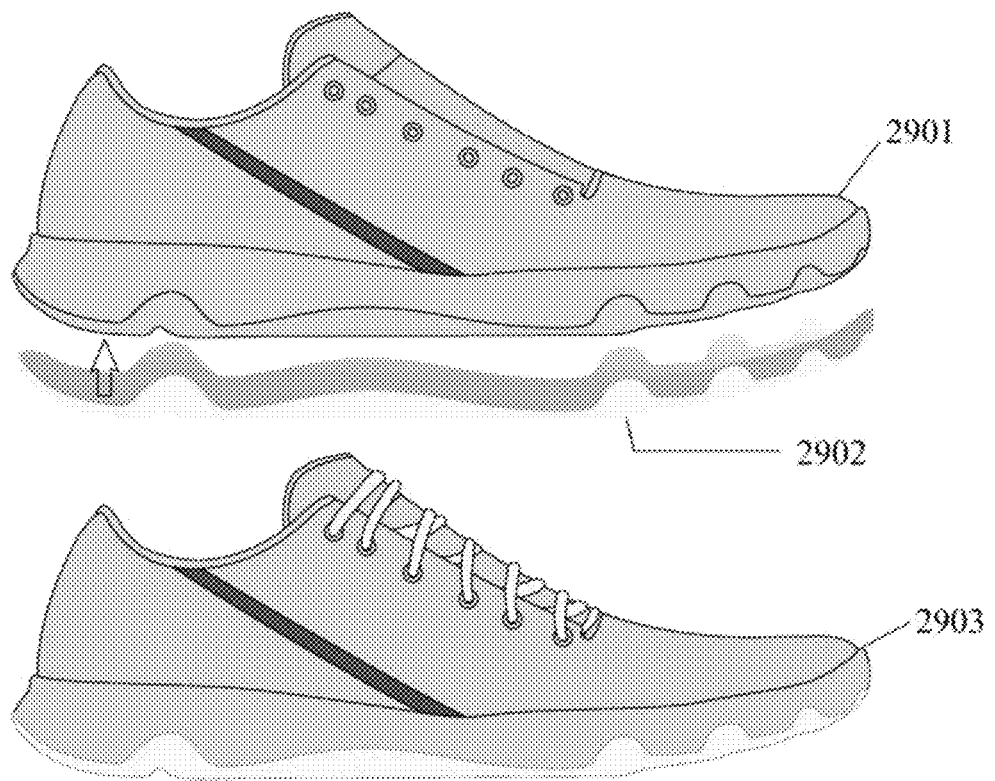
FIG. 29 shows a upper, a sole and an outsole according to the fifth example.
Figure 30:
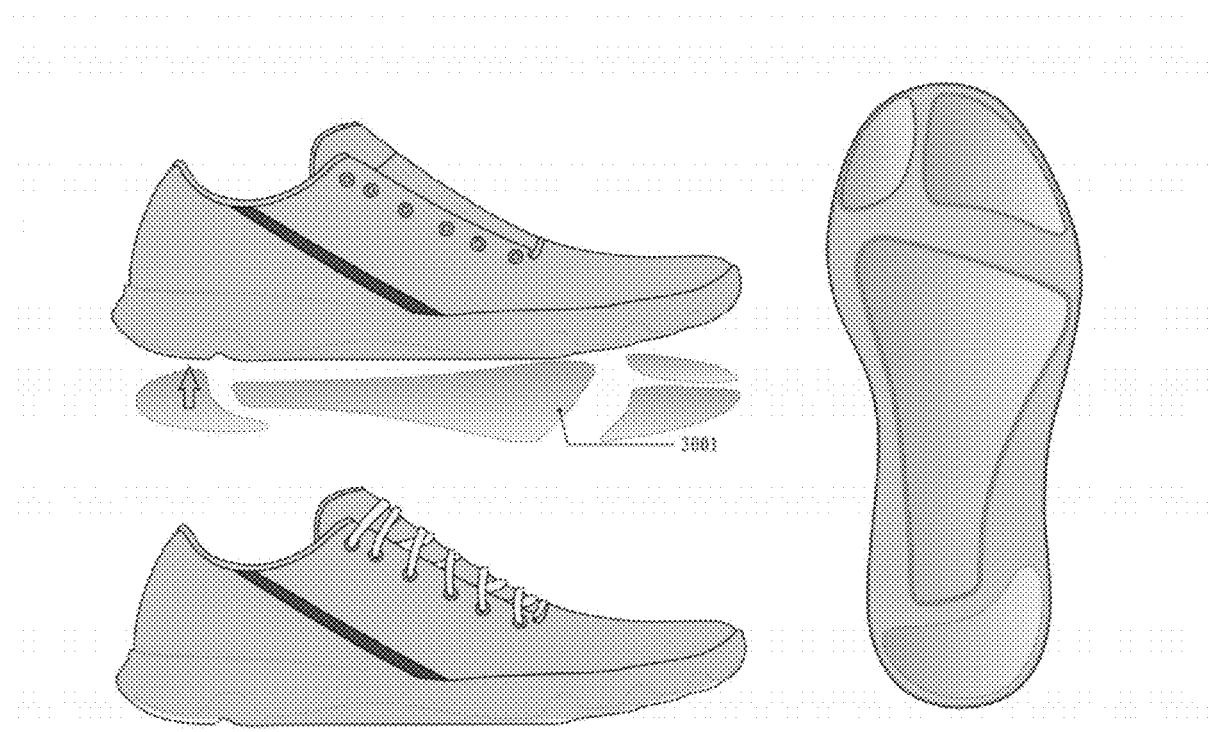
FIG. 30 shows the upper, the sole and another outsole according to the fifth example.

FIG. 29 shows that an outsole 2902 is affixed to the molded shoe body 2901 to form a finished shoe product 2903. Although the outsole shown is a single piece, it should be appreciated that an outsole 3001 comprising a number of separate pieces may also be employed, as shown in FIG. 30. Each piece of a multi-piece outsole may correspond to a different region of the sole (or midsole). The single-piece or multi-piece outsole is also applicable to other examples and embodiments herein described.

In any of the examples and embodiments, the lower part of the sole (or midsole) may comprise only a leakage preventing film without a fabric layer. In addition, the opening may be provided in the upper part of the sole or in the lower part of the sole. Also, presence of the upper part of the sole may not be necessary though preferred. Where the upper part of the sole is present, it may comprise a leakage preventing film only, or may comprise a leakage preventing film and a fabric layer. The opening for injecting the fill may be provided in either the upper side or the lower side of the sole.

According to a second embodiment of the present application, apart from injecting or pouring a fill (the first fill) into the cavity (the first accommodation space) formed or defined by the midsole, the upper of the shoe may further include a lower portion or extension, an upper rim of which is attached to the main body of the upper so that the lower portion or extension of the upper covers a lower part of the main body and a second accommodation space is formed between the lower portion or extension of the upper and the main body of the upper. In this case, a second fill is injected or poured into the second accommodation space. The midsole may be of a three-dimensional shape forming the first accommodation space adapted for the first fill material to be injected, as hereinbefore described. The midsole may comprise an upper part. At least a portion of the midsole may be wrapped around by the lower portion or extension of the upper, such that the first accommodation space or cavity for injecting the first fill material is formed between the lower portion or extension of the upper and the bottom surface of the upper part of the midsole. The first accommodation space and the second accommodation space may optionally have no visible or physical partition between them, so that they may form a single accommodation space for the fill.

An exemplary example of the second embodiment for a shoe including an upper will be described below, in which the second accommodation space for the second fill to be injected is formed between the lower portion of the upper and the main body of the upper.

In the illustrated example, the main body includes a front portion and a back portion attached to each other. However, it should be understood that the main body may be formed as a single piece, or may be formed of any number of pieces.

FIGS. 31A-38 show an exemplary example of a shoe with the fill between the lower portion of the upper and the main body of the upper.

Figure 31A:
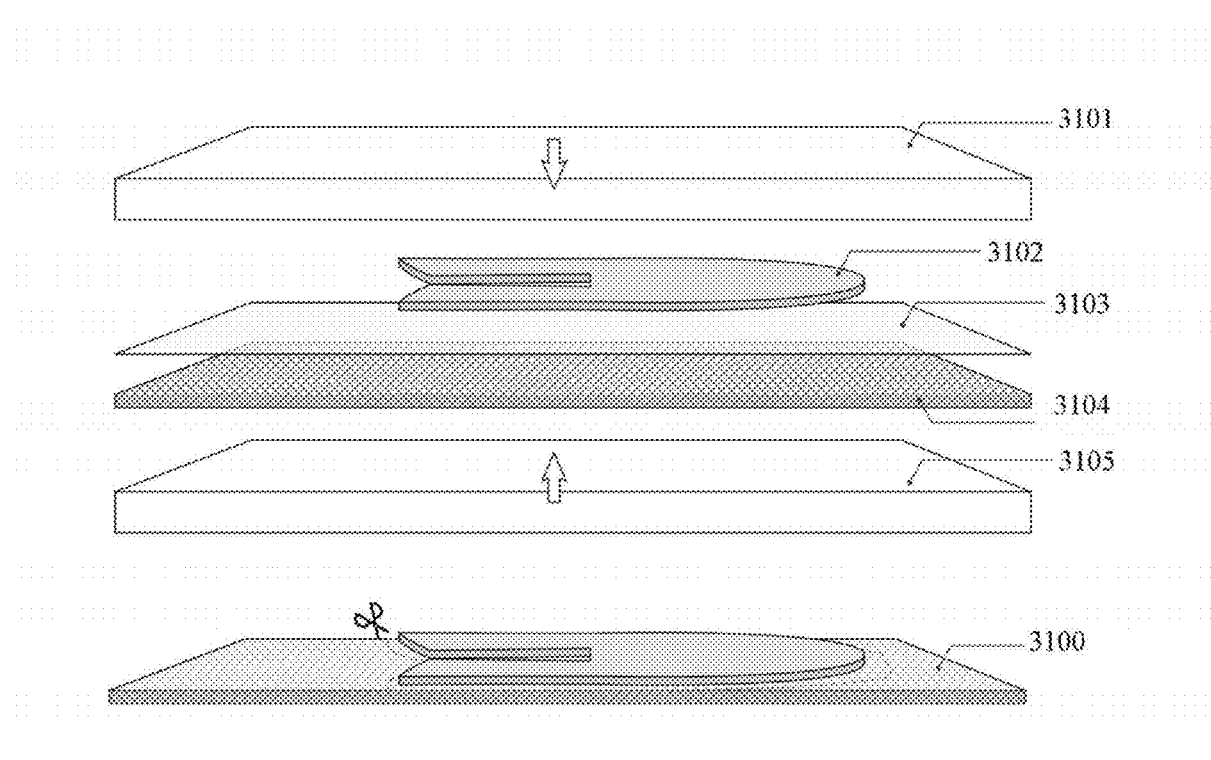
FIGS. 31A and 31B show a front portion according to an exemplary example of a second embodiment.
Figure 31B:
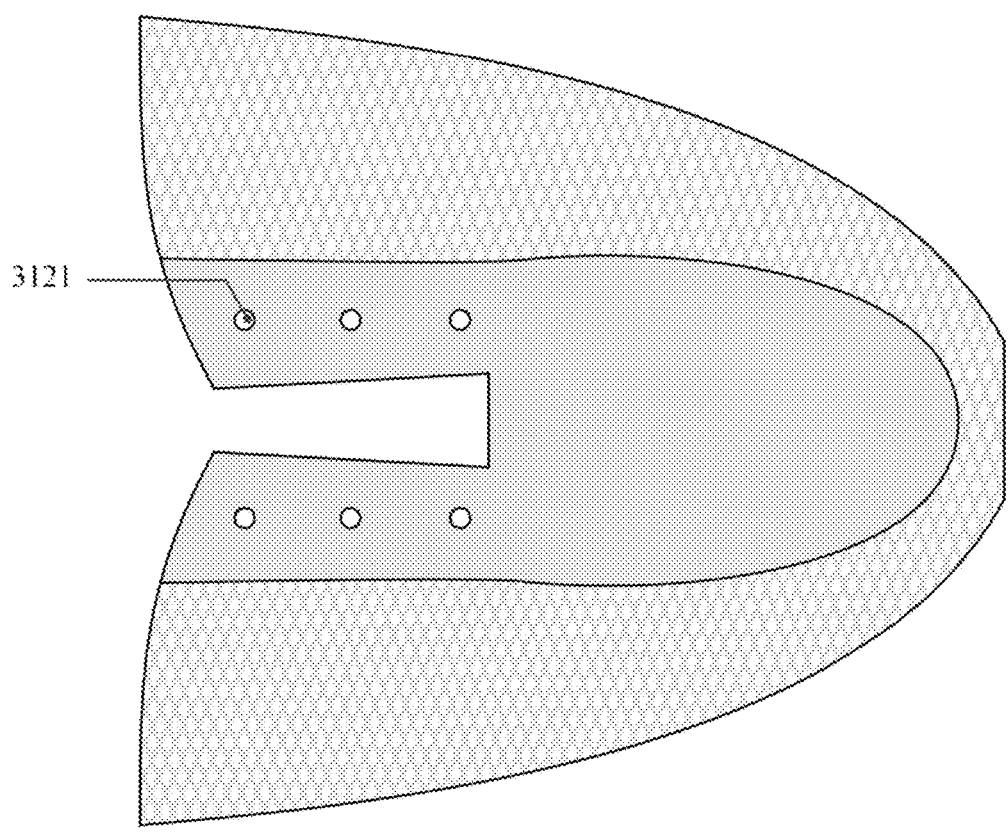

FIGS. 31A and 31B show the front portion according to the example. As shown in the figures, a front portion piece forming the front portion comprises three layers: a fabric layer 3102, a leakage preventing film 3103, and a pad 3104. The pad 3104 may be a foam or spacer layer. The fabric layer may be formed of fabric suitable for the front portion. The leakage preventing film 3103 may be thermoplastic polyurethane TPU, or other plastics or spray adhesives. The pad 3104 is preferably formed of material that would increase the elasticity and the breathability of the front portion. It should be understood that, although it is illustrated that the front portion piece includes three layers, the front portion piece may include one layer or two or more layers.

As shown in the figures, the fabric layer 3102, the leakage preventing film 3103 and the pad 3104 are stacked between an upper mold 3101 and a lower mold 3105 for molding to be performed under heat and pressure to form the front portion piece. FIG. 31A also shows the front portion piece 3100 which is formed after the molding process. FIG. 31B shows a semi-finished front portion piece obtained by trimming the molded front portion piece 3100, optionally including the formation of shoelace holes 3121. It is to be understood that, depending on the types of shoes, the shoelace holes 3121 may not be necessary.

Figure 32A:
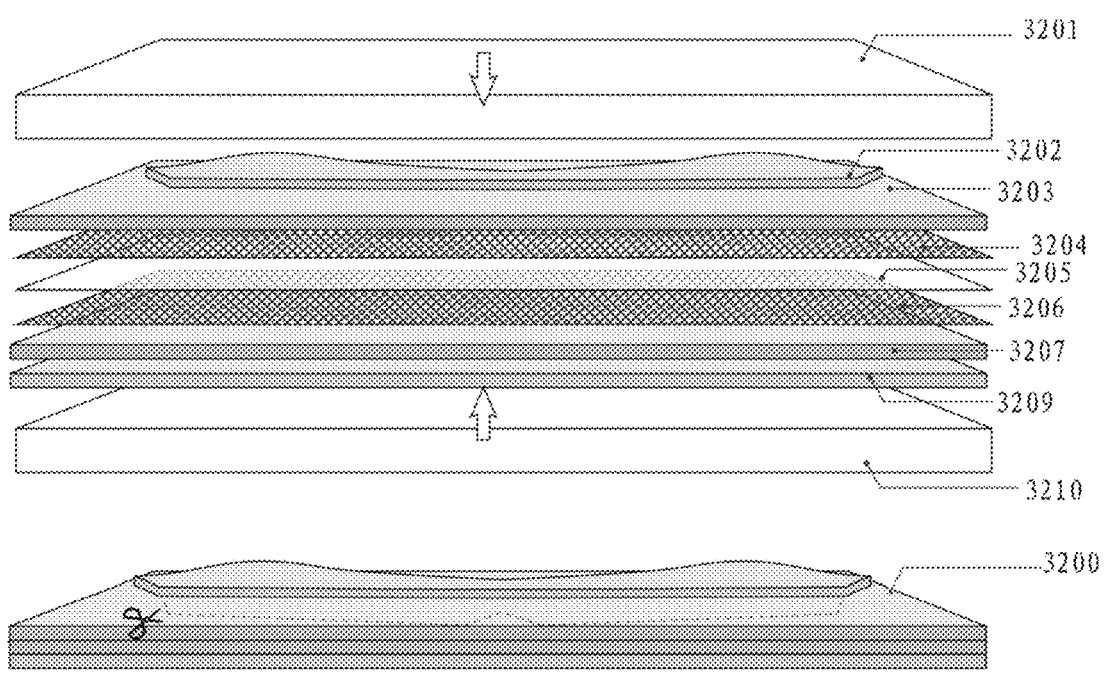
FIGS. 32A and 32B show a back portion according to the exemplary example of the second embodiment.
Figure 32B:
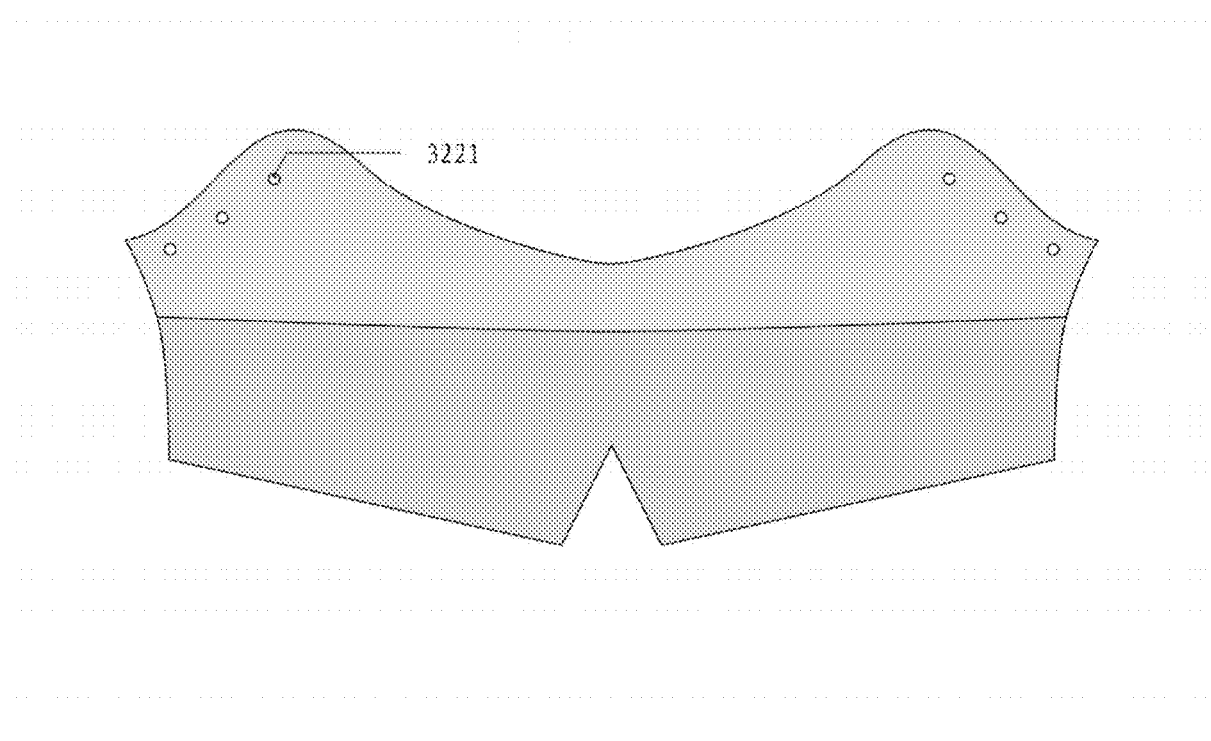

FIGS. 32A and 32B show a back portion according to the example. As shown in the figures, a back portion piece forming the back portion includes an upper fabric layer 3202, an upper foam layer 3203, an upper non-stretchable layer 3204, a leakage preventing film 3205, a lower non-stretchable layer 3206, a lower foam layer 3207, and a lower fabric layer 3209. The fabric layer may be formed of fabric suitable for the back portion. The non-stretchable layers provide protection for the heel, and are preferably yarn. The leakage preventing film 3205 may be thermoplastic polyurethane TPU, or other plastics or spray adhesives. FIG. 32B shows a back portion piece before formation into 3-D shape. As shown in the figure, the back portion piece includes a plurality of shoelace holes 3221. The locations of the shoelace holes are arranged to be passed through by the shoelace after the finished shoe product is formed. FIG. 32B also shows a V-shaped opening 3222 formed in the center portion of the back portion piece. The V-shaped opening 3222 has an opening downward. The opening will be closed, for example stitched, adhered or otherwise affixed together during subsequent procedure such that a 3-D shaped back portion, which comprises the portion corresponding to the heel region, is formed. It should be appreciated that the back portion piece may be single-layered or multi-layered, or may include any number of layers.

Figure 33A:
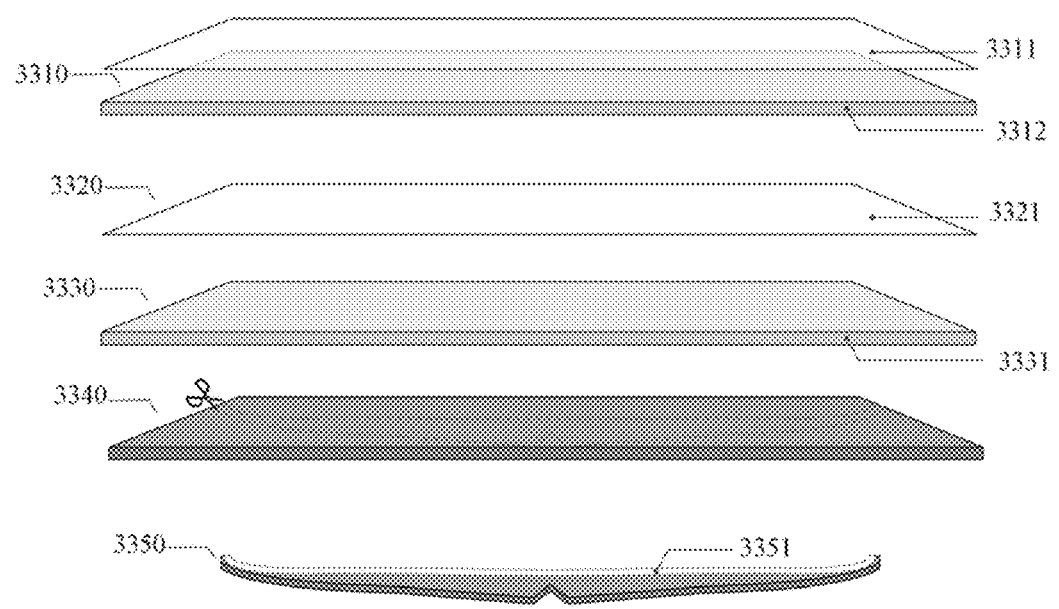
FIGS. 33A and 33B show a lower portion of the upper according to the exemplary example of the second embodiment.
Figure 33B:
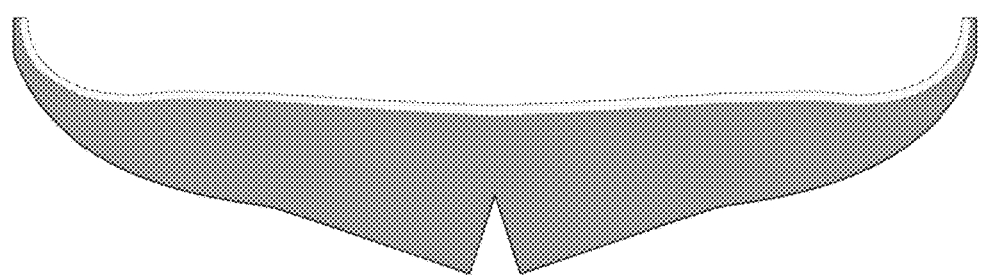

FIGS. 33A and 33B show several types of lower portions or extensions 3310, 3320, 3330 of the upper according to the example. As shown in the figures, the lower portion or extension 3310 preferably includes a fabric layer 3312 and a leakage preventing film 3311 covering or attached to the fabric layer 3312. Alternatively, the lower portion or extension 3320 includes only a leakage preventing film 3321. Alternatively, the lower portion or extension 3330 is formed of leatherette 3331. After trimming, the lower portion or extension of the upper 3340 forms a semi-finished lower portion 3350 of the upper having a proper shape. By coating adhesive 3351 to an upper edge of the semi-finished lower portion 3350, the lower portion or extension 3350 may be adhered to the main body of the upper, such that the second accommodation space or cavity is formed between the lower portion of the upper and the main body of the upper. FIG. 33B shows a top view of the semi-finished lower portion 3350 before its forming into 3-D shape. The lower portion shown in FIGS. 33A and 33B includes a V-shaped opening 3352 in the center lower part. The V-shaped opening 3352 has an opening downward which will be closed, for example stitched, adhered or otherwise affixed together during subsequent procedure such that a 3-D shape will be formed. The closed opening corresponds to the heel region.

Figure 34A:
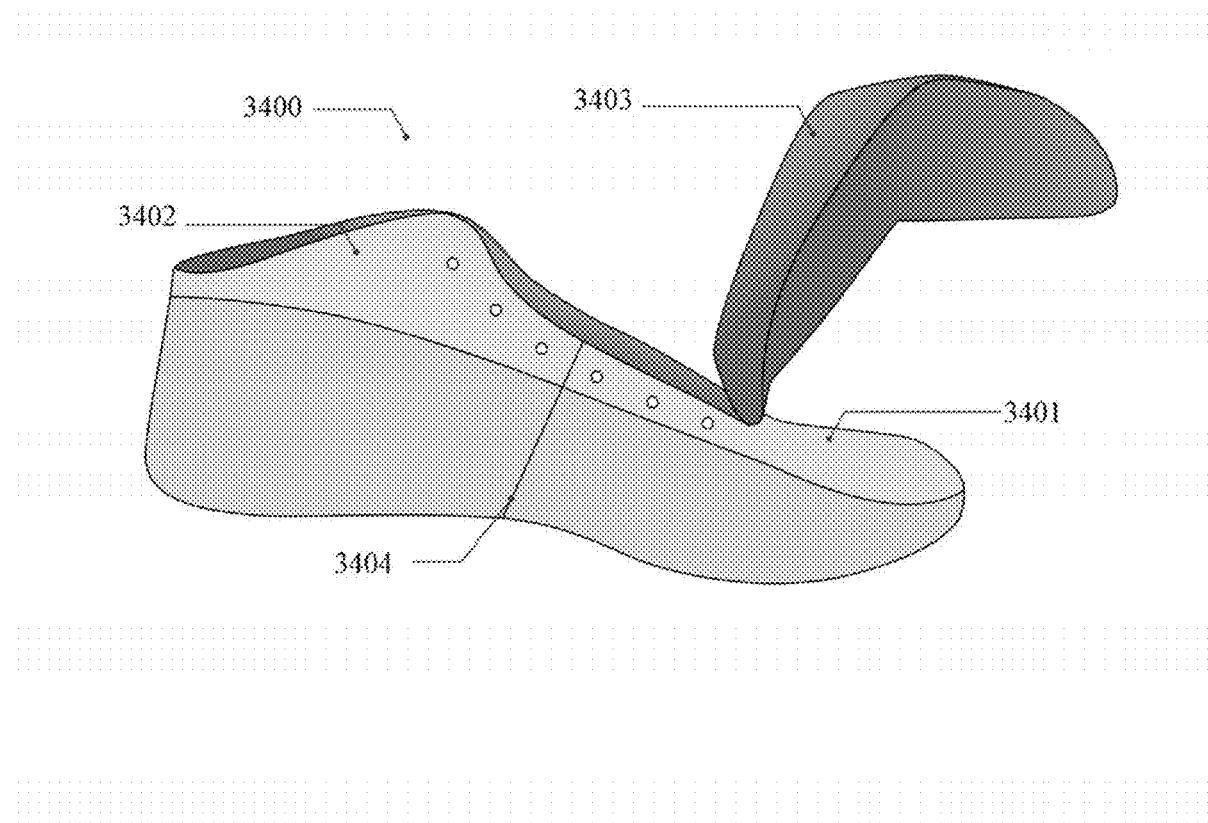
FIG. 34A shows a semi-finished shoe formed by splicing a front portion, a back portion and a shoe tongue together according to the exemplary example of the second embodiment.
Figure 34B:
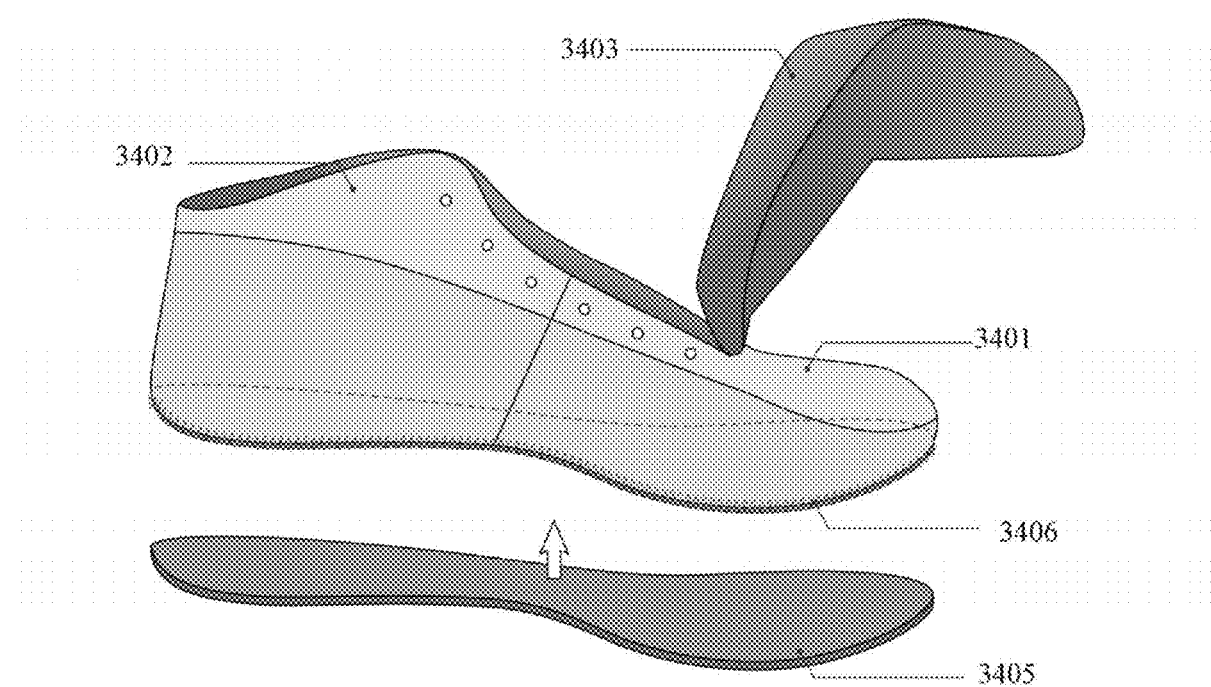

FIG. 34A shows a semi-finished shoe 3400 formed by splicing the front portion, the back portion and the shoe tongue together. As shown in the figure, the front portion 3401 and the back portion 3402 are spliced together at a seam line 3404. The splicing may for example be by stitching. The shoe tongue 3403 is also affixed to the front portion 3401. FIG. 34B shows that the semi-finished shoe formed by splicing the front portion 3401, the back portion 3402 and the shoe tongue 3403 is further affixed to an upper part 3405 of the midsole. The upper part 3405 of midsole, the front portion 3401, and the back portion 3402 are affixed together, for example by stitching 3406. It should be appreciated that the splicing or affixing may also be accomplished by seamless means such as welding, or by any other suitable means.

Figure 35A:
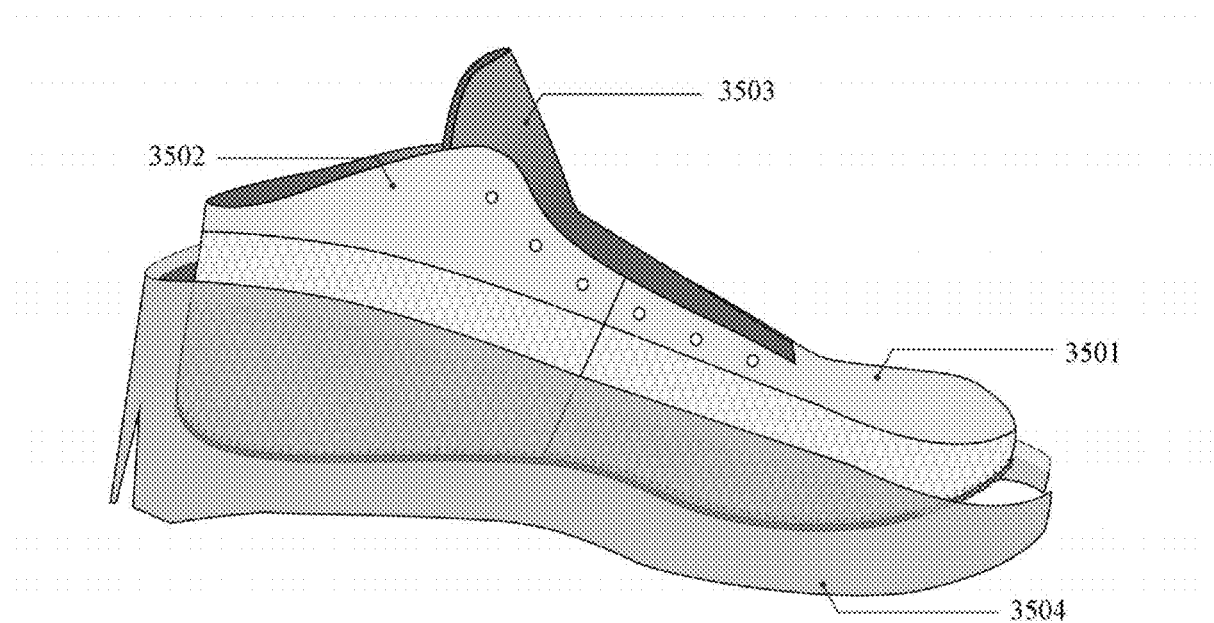
Figure 35B:
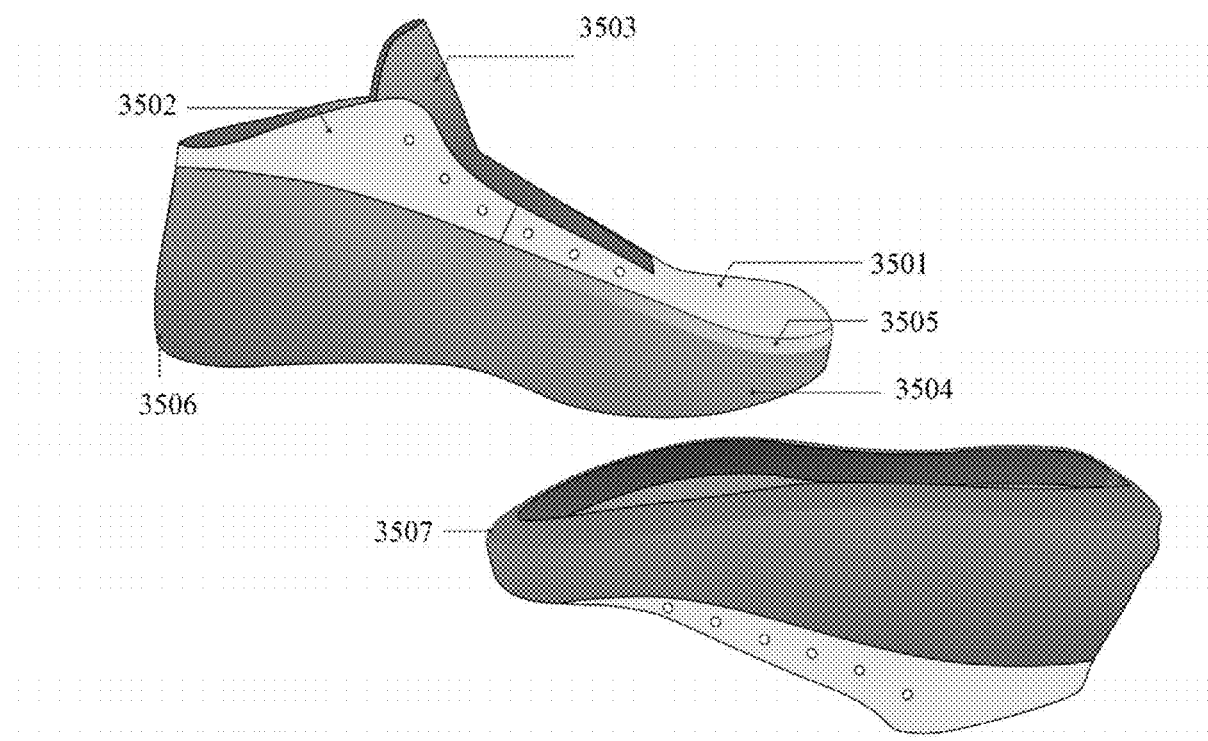
FIG. 35B shows a semi-finished shoe formed by affixing the shoe body and the lower portion of the upper shown in FIG. 35A together.

FIG. 35A shows a skirt-like lower portion or lower extension of the upper 3504 being attached, for example by adhesives, to a semi-finished shoe comprising the front portion 3501, the back portion 3502, the shoe tongue 3503, and the upper part of the midsole. The front portion 3501 and the back portion 3502 together form the main body of the upper. As shown in the figure, an upper rim of the lower portion 3504 of the upper is attached to the main body of the upper so that a second accommodation space or cavity is formed between the lower portion 3504 of the upper and the main body of the upper. FIG. 35B shows that the upper rim of the lower portion 3504 of the upper attached to the main body of the upper. As can be seen in the figures, the lower portion or extension of the upper covers the lower part of the main body of the upper. FIG. 35B further shows that, after the lower portion 3504 of the upper is attached to the main body, the opening 3352 in the center portion of the lower portion of the upper (see FIG. 33B) is stitched along the stitching line 3506, and the two ends of the lower portion of the upper piece are also stitched together along the stitching line 3507, so that an accommodation space for a fill is formed between the upper part of the midsole and a wrapped-around part of the lower portion or extension of the upper, as illustrated in FIG. 35B.

Figure 36A:
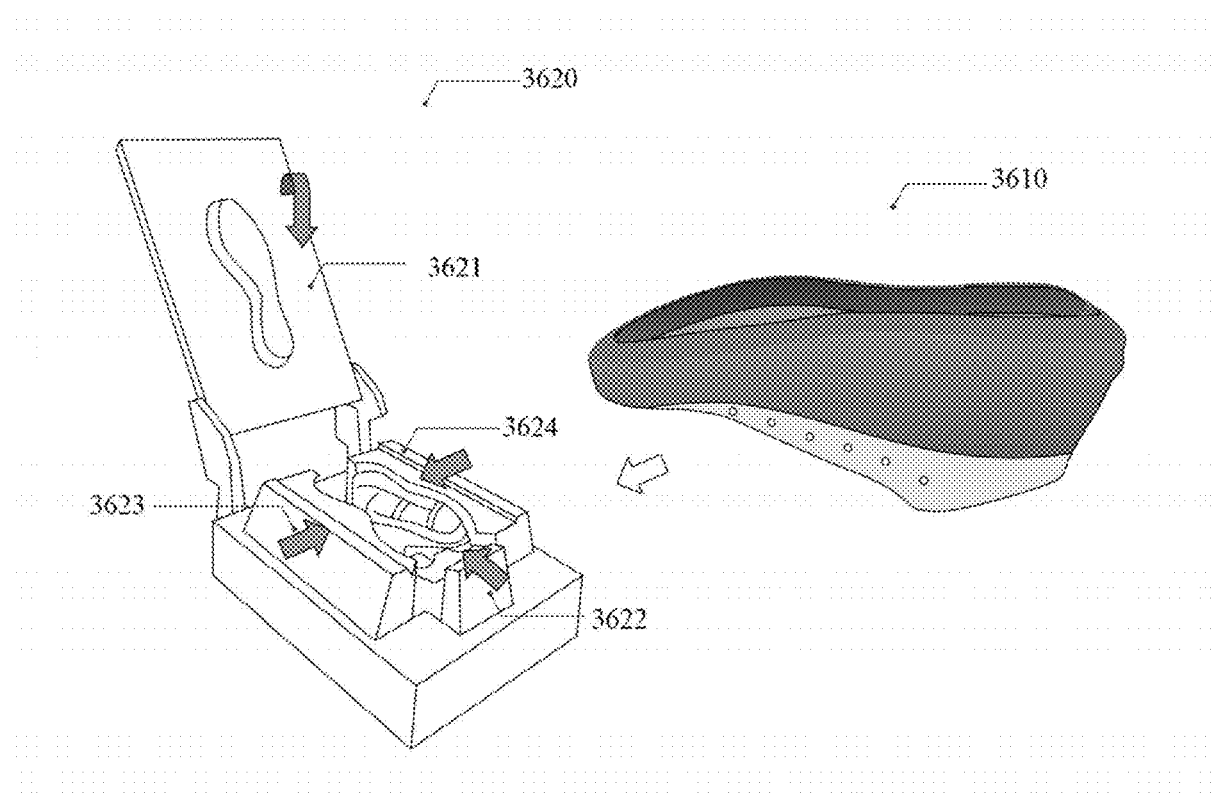
FIGS. 36A, 36B, 36C and 36D are diagrams showing the molding of a shoe body attached with a lower portion of the upper according to the exemplary example of the second embodiment.

FIGS. 36A to 36D show a process for molding the shoe including the lower portion or extension of the upper. FIG. 36A shows the shoe body 3610 and a mold 3620 for applying molding to the shoe body 3610. As shown in the figure, the mold 3620 includes an upper mold 3621, a front mold 3622, a left mold 3623, and a right mold 3624. The upper mold 3621 corresponds to the position of the sole and is used for molding the midsole with the fill injected or poured; the front mold 3622 corresponds to the position of the front portion and is used for molding the front end of the front portion with the fill injected or poured; the left mold 3623 and the right mold 3624 correspond to two sides of the shoe body and are used for molding the sides of the shoe with the fill injected or poured.

Figure 36B:
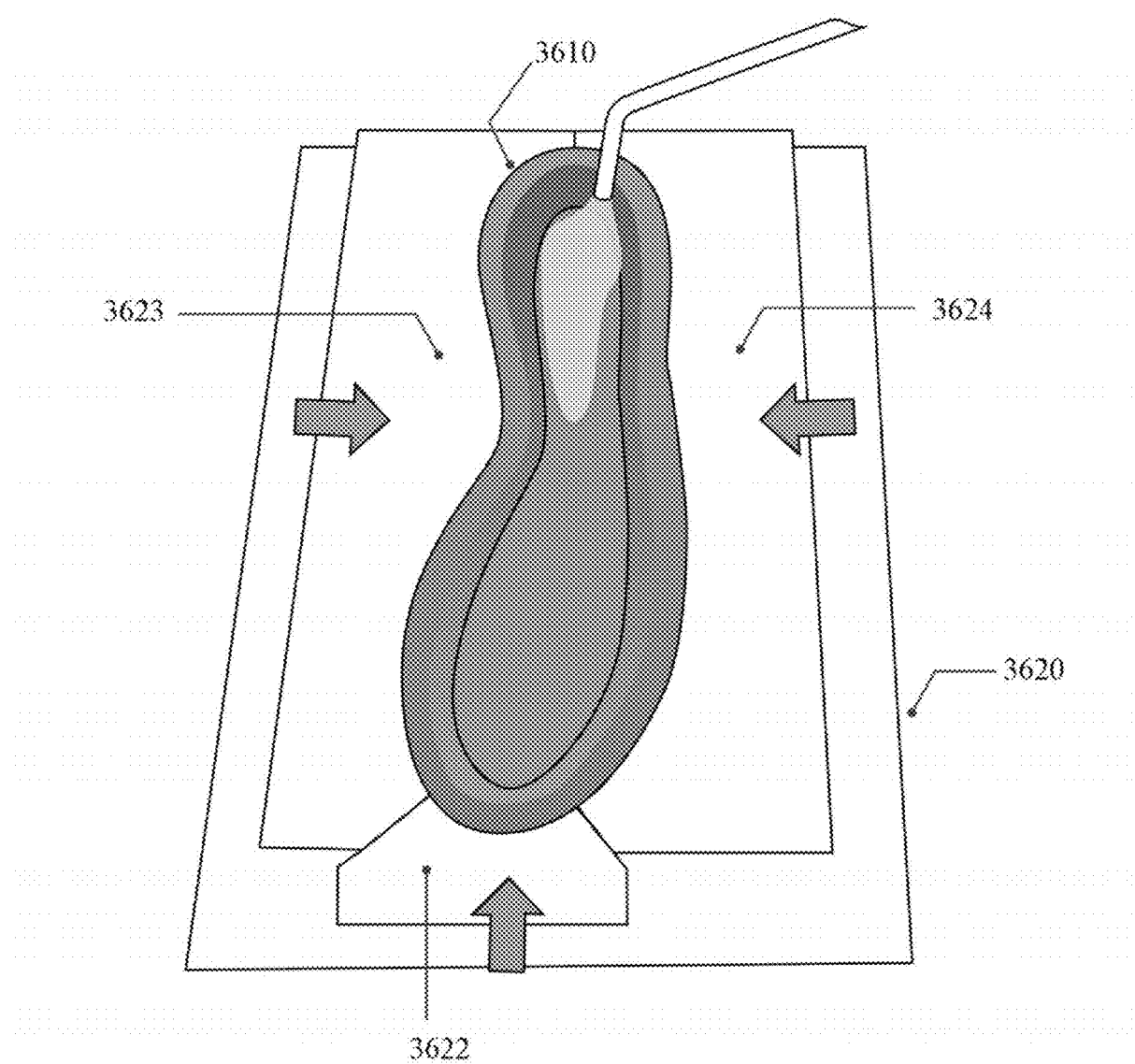
Figure 36C:
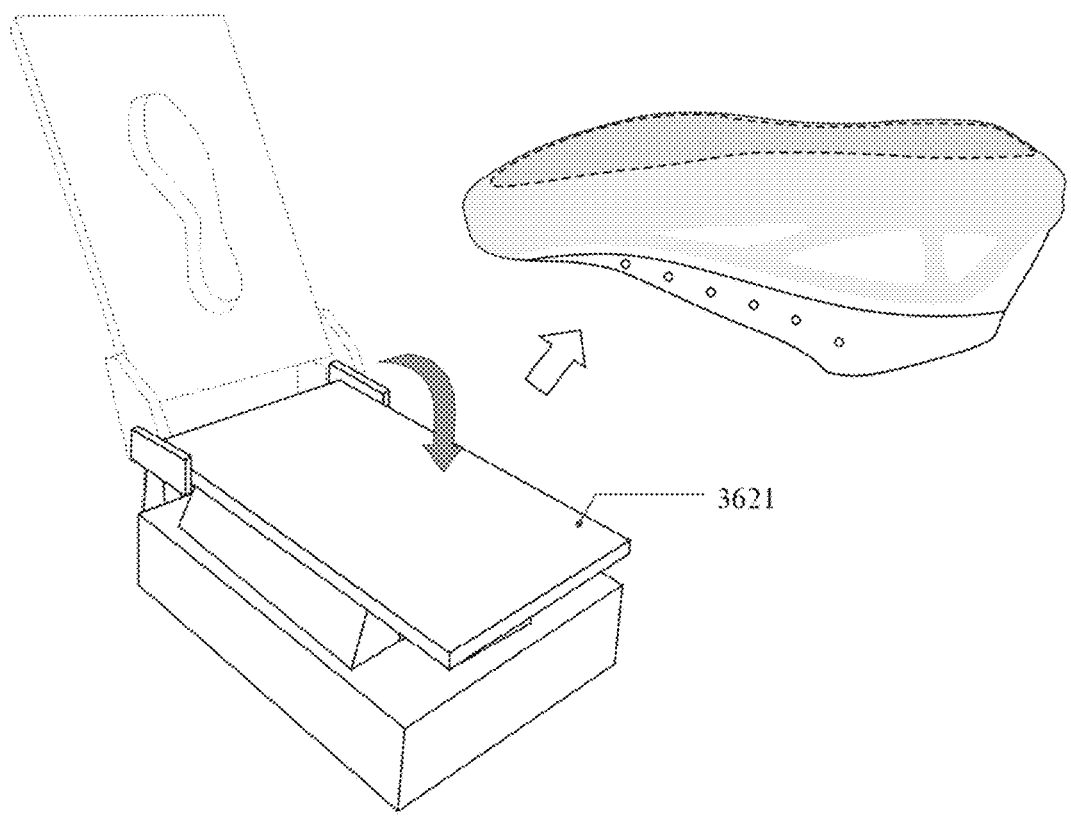
Figure 36D:
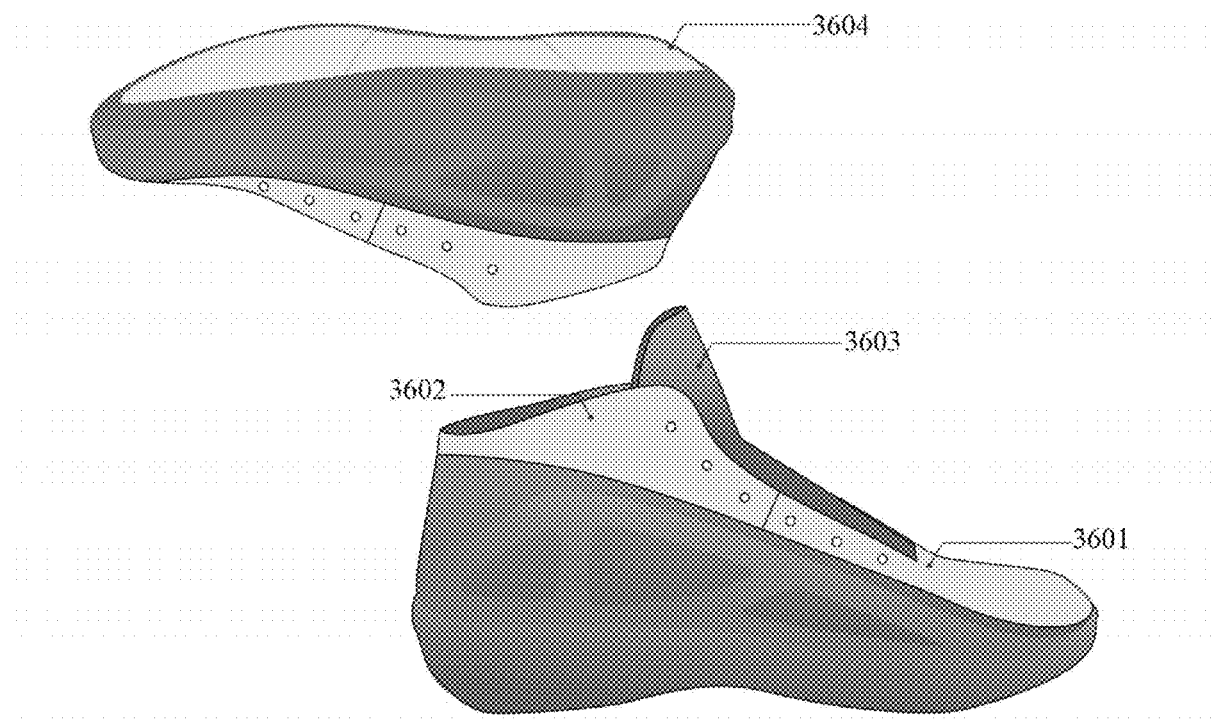
Figure 37:
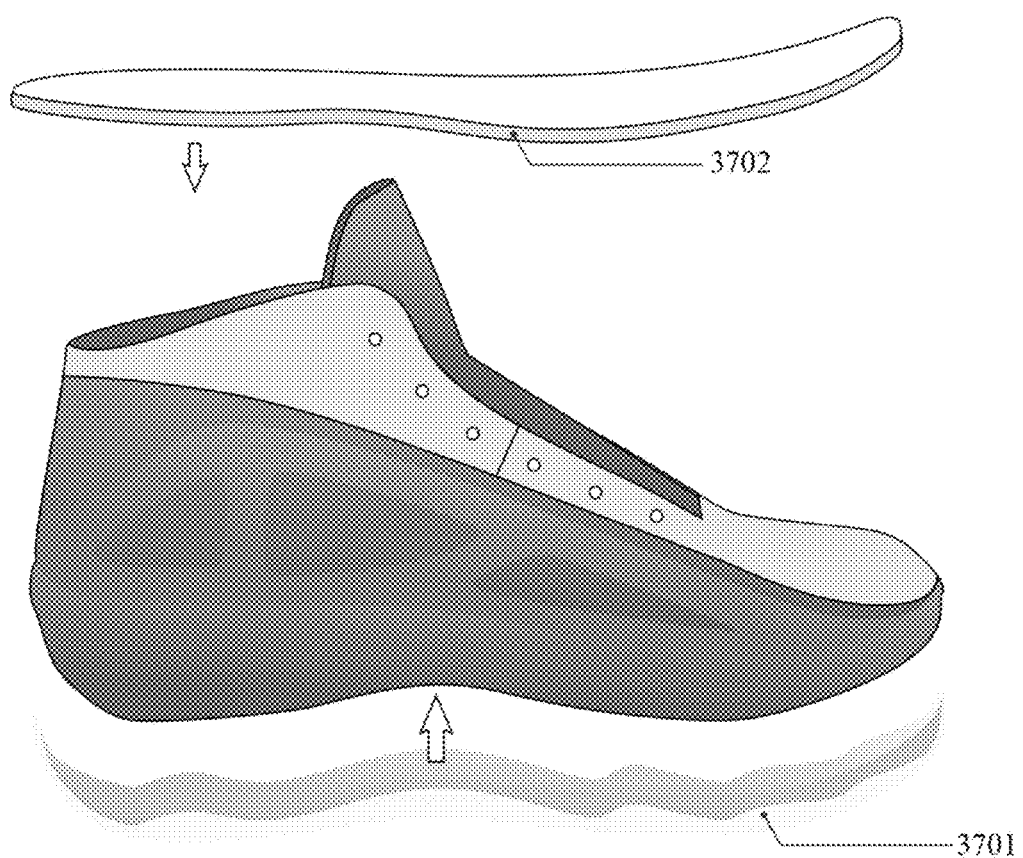
FIG. 37 shows a shoe body affixed with an outsole and an insole.

As shown in FIG. 36B, after the shoe body 3610 is placed in the mold 3620, the front mold 3622, the left mold 3623, and the right mold 3624 with pre-determined shapes are closed, and the fill is injected into the accommodation space 3630 formed between the lower portion or extension of the upper and the main body of the upper and between the lower portion or extension of the upper and the upper part of the midsole, such that after molding completes, i.e. after the fill has expanded and been cured, the lower part of the shoe body has a desired shape corresponding to the front mold 3622, the left mold 3623 and the right mold 3624. Thereafter, or alternatively at the same time, as shown in FIG. 36C, the upper mold 3621 is closed, such that after molding completes, i.e. after the fill has expanded and been cured, the midsole has a desired shape corresponding to the upper mold. After the injection and shaping are finished, as shown in FIG. 36D, an edge line 3604 is trimmed so as to obtain the injection-molded and shaped midsole. FIG. 36D shows the front portion 3601, the back portion 3602, the shoe tongue 3603 and the molded lower part of the upper. As can be seen, after the molding process, i.e. after injection or pouring and curing, the cured fill that fills the accommodation space between the lower portion or extension of the upper and the lower part of the main body forms and defines the shape of the molded lower part of the upper. In the example embodiment shown in FIG. 36D, the bottom surface of the midsole includes mainly the cured fill. Also, the lower portion or extension of the upper wraps around at least a portion of the midsole, so that the bottom surface of the midsole also includes the wrapped around portion of the lower portion or extension of the upper. It should also be understood that, the accommodation space 3630 shown in the figure includes the first accommodation space formed between the lower portion or extension of the upper and the upper part of the midsole and the second accommodation space formed between the lower portion or extension of the upper and the main body of the upper. That is, in the present description, the space formed between the bottom side of the upper part of the midsole and the lower portion or extension of the upper wrapping around the midsole is referred to as the first accommodation space, and the space formed between the outer surface of the main body of the upper and the inner surface of the lower portion or extension of the upper is referred to as the second accommodation space. It should be appreciated that the first accommodation space and the second accommodation space may form a single accommodation space without any visible or structural partition in between. Also, the fills filled into the first accommodation space and the second accommodation space may be homogeneous or of the same material. FIG. 37 shows an outsole 3701 attached to the bottom surface of the midsole, and a lining 3702 placed on the upper side of the midsole, i.e., within the shoe body.

Figure 38:
FIG. 38 shows a finished shoe according to the exemplary embodiment of the second embodiment.

FIG. 38 shows the finally finished shoe. According to an example of the present application, for example, PU or PU foam is injected into the accommodation space formed within the shoe body. By wrapping the fill, the density of the entire shoe is reduced without degrading the performance of, for example, PU sole, thereby reducing the total weight.

Most existing midsoles are usually formed of EVA foamed materials, and the other few are formed of PU foamed materials. The density of an EVA midsole is in a range of 0.2-0.3 g/cm³ which provides an advantage of lightness; and a modest resilience of 35%-55% is provided; the disadvantage of the EVA midsole is the poor compressional deformation rate of a range from 60% to 35%, which results in a poor durability as it is deformed easily from long wear. In another aspect, the advantage of regular PU foamed midsole is a lower compressional deformation rate of less than 10%, which provides a durability property; a good resilience in a range of 45%-65% is provided; and the drawback is a high density of 0.3-0.4 g/cm³ which results in a heavy weight. The novel PU midsole proposed in the present application has a density in a range below 0.2 g/cm³ while preserving the advantage of high resiliency and lower compressional deformation rate provided by regular PU foamed midsole so that a light-weight, high-resiliency and durable midsole is provided.

Moreover, a better wrapping and protection for the heel and the ankle can be achieved with the injection and the shaping of the fill at the sides of the shoe.

The exemplary embodiments of the present application have been described above with reference to the accompanying figures. It should be understood by those skilled in the art that, unless clearly stated or there is a conflict otherwise, the technical features described in one embodiment/example above may also be used for other embodiments/examples, and the proper variations and modifications of the embodiments/examples described herein are applicable to the present invention without going beyond the scope of the present invention.

The invention claimed is:

1. A shoe, comprising:
    an upper comprising a main body, the main body being provided with an extension, such that an upper rim of the extension is attached to the main body, and the extension overlaps a lower part of the main body;
    a midsole; and
    an insole located on an upper side of the midsole;
    wherein the midsole comprises a fill that occupies a space comprising a first space defined between a wrapped-around portion of the extension and the insole and a second space defined between the extension and the lower part of the main body overlapped by the extension.

2. The shoe as claimed in claim 1, further comprising an outsole attached to and covering a bottom surface of the midsole.

3. The shoe as claimed in claim 1, wherein the insole comprises a first fabric layer and a first leakage-preventing film attached to a lower side of the first fabric layer to prevent leakage of said fill.

4. The shoe as claimed in claim 1, wherein the main body comprises a second fabric layer and a second leakage-preventing film attached to the second fabric layer to prevent leakage of said fill.

5. The shoe as claimed in claim 1, wherein the main body comprises a front portion and a back portion attached to each other, and the back portion is formed by molding.

6. The shoe as claimed in claim 1, wherein the extension includes a fabric layer and a leakage-preventing material attached to and covering the fabric layer.

7. The shoe as claimed in claim 1, wherein the fill is a thermoset material made of polyurethane or polyurethane foam.

8. The shoe as claimed in claim 1, wherein the space which said fill occupies is shaped by molding.

* * * * *